United States Patent
Ellis et al.

(10) Patent No.: US 11,988,593 B2
(45) Date of Patent: May 21, 2024

(54) ADVANCED SYSTEMS AND METHODS FOR INTERFEROMETRIC PARTICLE DETECTION AND DETECTION OF PARTICLES HAVING SMALL SIZE DIMENSIONS

(71) Applicant: Particle Measuring Systems, Inc., Boulder, CO (US)

(72) Inventors: Timothy A Ellis, Boulder, CO (US); Chris Bonino, Boulder, CO (US); Brian A. Knollenberg, Boulder, CO (US); James Lumpkin, Boulder, CO (US); Daniel Rodier, Boulder, CO (US); Dwight Sehler, Boulder, CO (US); Mehran Vahdani Moghaddam, Boulder, CO (US); Thomas Ramin, Boulder, CO (US)

(73) Assignee: PARTICLE MEASURING SYSTEMS, INC., Boulder, CO (US)

( * ) Notice: Subject to any disclaimer, the term of this patent is extended or adjusted under 35 U.S.C. 154(b) by 0 days.

(21) Appl. No.: 16/953,987

(22) Filed: Nov. 20, 2020

(65) Prior Publication Data
US 2021/0208054 A1    Jul. 8, 2021

Related U.S. Application Data

(60) Provisional application No. 62/939,232, filed on Nov. 22, 2019.

(51) Int. Cl.
G01N 15/14     (2006.01)
G01N 15/1434   (2024.01)

(52) U.S. Cl.
CPC . *G01N 15/1436* (2013.01); *G01N 2015/1452* (2013.01); *G01N 2015/1454* (2013.01)

(58) Field of Classification Search
None
See application file for complete search history.

(56) References Cited

U.S. PATENT DOCUMENTS

| 4,540,283 A | 9/1985 | Bachalo |
| 4,594,715 A | 6/1986 | Knollenberg |

(Continued)

FOREIGN PATENT DOCUMENTS

| AU | 2004256318 | 7/2004 |
| CN | 1587984 | 3/2005 |

(Continued)

OTHER PUBLICATIONS

Allen (1983) "Particle Size Analysis," John Wiley & Sons; ISBN: 0471262218 (table of contents only), 5 pp.

(Continued)

*Primary Examiner* — Rufus L Phillips
(74) *Attorney, Agent, or Firm* — Leydig Voit & Mayer, Ltd.

(57) ABSTRACT

The present invention relates to interferometric detection of particles and optical detection of particles having size dimensions less than or equal to 100 nm. Systems and methods are provided exhibiting enhanced alignment and stability for interferometric detection of particles and/or optical detection of particles having size dimensions less than or equal to 100 nm. Systems and methods are provided that include compensation means for mitigating the impact of internal and external stimuli and changes in operating conditions that can degrade the sensitivity and reliability of particle detection via optical methods, including interferometric-based techniques and/or systems for optical detection of particles having size dimensions less than or equal to 100 nm.

27 Claims, 15 Drawing Sheets

(56) References Cited

U.S. PATENT DOCUMENTS

| | | |
|---|---|---|
| 4,690,561 A * | 9/1987 | Ito .................. G01N 15/1434 356/73 |
| 4,783,599 A | 11/1988 | Borden |
| 4,798,465 A | 1/1989 | Knollenberg |
| 4,806,774 A | 2/1989 | Lin et al. |
| 4,854,705 A | 8/1989 | Bachalo |
| 4,893,928 A | 1/1990 | Knollenberg |
| 4,906,094 A | 3/1990 | Ashida |
| 4,917,494 A | 4/1990 | Poole et al. |
| 4,963,003 A | 10/1990 | Hiiro |
| 4,989,978 A | 2/1991 | Groner |
| 5,063,301 A | 11/1991 | Turkevich et al. |
| 5,282,151 A | 1/1994 | Knollenberg |
| 5,283,199 A | 2/1994 | Bacon, Jr. et al. |
| 5,471,298 A | 11/1995 | Moriya |
| 5,532,943 A | 7/1996 | Asano et al. |
| 5,585,921 A | 12/1996 | Pepper et al. |
| 5,660,985 A | 8/1997 | Pieken et al. |
| 5,671,046 A | 9/1997 | Knowlton |
| 5,719,667 A | 2/1998 | Miers |
| 5,726,753 A | 3/1998 | Sandberg |
| 5,739,527 A | 4/1998 | Hecht et al. |
| 5,751,422 A | 5/1998 | Mitchell |
| 5,805,281 A | 9/1998 | Knowlton et al. |
| 5,861,950 A | 1/1999 | Knowlton |
| 5,889,589 A | 3/1999 | Sandberg |
| 5,903,338 A | 5/1999 | Mavliev et al. |
| 5,995,650 A * | 11/1999 | Migdal .................. G06T 9/001 348/E13.016 |
| 5,999,256 A | 12/1999 | Jones |
| 6,084,671 A | 7/2000 | Holcomb |
| 6,137,572 A | 10/2000 | DeFreez et al. |
| 6,167,107 A | 12/2000 | Bates |
| 6,246,474 B1 | 6/2001 | Cerni et al. |
| 6,275,290 B1 | 8/2001 | Cerni et al. |
| 6,532,067 B1 | 3/2003 | Chang et al. |
| 6,615,679 B1 | 9/2003 | Knollenberg et al. |
| 6,709,311 B2 | 3/2004 | Cerni |
| 6,859,277 B2 | 2/2005 | Wagner et al. |
| 6,903,818 B2 | 6/2005 | Cerni et al. |
| 6,945,090 B2 | 9/2005 | Rodier |
| 7,030,980 B1 | 4/2006 | Sehler et al. |
| 7,088,446 B2 | 8/2006 | Cerni |
| 7,088,447 B1 | 8/2006 | Bates et al. |
| 7,092,078 B2 | 8/2006 | Nagai et al. |
| 7,208,123 B2 | 4/2007 | Knollenberg et al. |
| 7,235,214 B2 | 6/2007 | Rodier et al. |
| RE39,783 E | 8/2007 | Cerni et al. |
| 7,456,960 B2 | 11/2008 | Cerni et al. |
| 7,526,158 B2 | 4/2009 | Novotny et al. |
| 7,528,959 B2 | 5/2009 | Novotny et al. |
| 7,561,267 B2 | 7/2009 | Luo et al. |
| 7,576,857 B2 | 8/2009 | Wagner |
| 7,630,147 B1 | 12/2009 | Kar et al. |
| 7,667,839 B2 | 2/2010 | Bates |
| 7,746,469 B2 | 6/2010 | Shamir et al. |
| 7,796,255 B2 | 9/2010 | Miller |
| 7,876,450 B2 | 1/2011 | Novotny et al. |
| 7,916,293 B2 | 3/2011 | Mitchell et al. |
| 7,973,929 B2 | 7/2011 | Bates |
| 7,985,949 B2 | 7/2011 | Rodier |
| 8,027,035 B2 | 9/2011 | Mitchell et al. |
| 8,109,129 B2 | 2/2012 | Gorbunov |
| 8,143,600 B2 * | 3/2012 | Seibel .................. G06T 11/006 250/461.2 |
| 8,154,724 B2 | 4/2012 | Mitchell et al. |
| 8,174,697 B2 | 5/2012 | Mitchell et al. |
| 8,427,642 B2 | 4/2013 | Mitchell et al. |
| 8,465,791 B2 | 6/2013 | Liu et al. |
| 8,605,282 B2 | 12/2013 | Groswasser |
| 8,705,040 B2 | 4/2014 | Trainer |
| 8,800,383 B2 | 8/2014 | Bates |
| 8,822,952 B2 | 9/2014 | Muto et al. |
| 8,869,593 B2 | 10/2014 | Gorbunov et al. |
| 9,063,117 B2 | 6/2015 | Gourley |
| 9,068,916 B2 | 6/2015 | Heng |
| 9,631,222 B2 | 4/2017 | Ketcham et al. |
| 9,638,665 B2 | 5/2017 | Gorbunov |
| 9,682,345 B2 | 6/2017 | Gromala et al. |
| 9,808,760 B2 | 11/2017 | Gromala et al. |
| 9,810,558 B2 | 11/2017 | Bates et al. |
| 9,857,284 B1 | 1/2018 | Javadi et al. |
| 9,885,640 B2 | 2/2018 | Ketcham et al. |
| 9,952,136 B2 | 4/2018 | Javadi et al. |
| 9,983,113 B2 | 5/2018 | Matsuda et al. |
| 9,989,462 B2 | 6/2018 | Lumpkin et al. |
| 10,197,487 B2 | 2/2019 | Knollenberg et al. |
| 10,345,200 B2 | 7/2019 | Scialo et al. |
| 10,345,246 B2 | 7/2019 | Tian et al. |
| 10,371,620 B2 | 8/2019 | Knollenberg et al. |
| 10,416,069 B2 | 9/2019 | Saitou et al. |
| 10,792,694 B2 | 10/2020 | Gorbunov et al. |
| 10,859,487 B2 | 12/2020 | Knollenberg et al. |
| 10,908,059 B2 | 2/2021 | Knollenberg et al. |
| 10,921,229 B2 | 2/2021 | Shamir |
| 10,928,293 B2 | 2/2021 | Knollenberg et al. |
| 10,997,845 B2 | 5/2021 | MacLaughlin et al. |
| 11,181,455 B2 | 11/2021 | Bates et al. |
| 11,215,546 B2 | 1/2022 | MacLaughlin et al. |
| 11,237,095 B2 | 2/2022 | Rodier et al. |
| 11,255,760 B2 | 2/2022 | Scialò et al. |
| 11,268,930 B2 | 3/2022 | Rodier et al. |
| 11,320,360 B2 | 5/2022 | Lumbkin |
| 11,385,161 B2 | 7/2022 | Bates |
| 11,416,123 B2 | 8/2022 | Pandolfi et al. |
| 11,540,248 B2 | 12/2022 | Scialò et al. |
| 11,576,045 B2 | 2/2023 | Michaelis et al. |
| 2003/0030783 A1 * | 2/2003 | Roche .................. G01N 1/38 356/436 |
| 2004/0021868 A1 | 2/2004 | Ortyn |
| 2004/0023293 A1 | 2/2004 | Kreimer |
| 2004/0036874 A1 * | 2/2004 | Kramer .............. G01N 15/1459 356/342 |
| 2005/0028593 A1 | 2/2005 | Rodier |
| 2005/0138934 A1 | 6/2005 | Weigert et al. |
| 2005/0179896 A1 | 8/2005 | Girvin et al. |
| 2007/0030492 A1 | 2/2007 | Novotny et al. |
| 2007/0165225 A1 | 7/2007 | Trainer |
| 2007/0263215 A1 | 11/2007 | Bachalo et al. |
| 2008/0037004 A1 | 2/2008 | Shamir et al. |
| 2008/0079929 A1 | 4/2008 | Luo et al. |
| 2009/0067035 A1 | 3/2009 | Foster et al. |
| 2009/0078862 A1 | 3/2009 | Rodier et al. |
| 2009/0128810 A1 | 5/2009 | Bates |
| 2009/0139311 A1 * | 6/2009 | Lehto .................. B01L 3/50851 73/864.91 |
| 2009/0190128 A1 | 7/2009 | Cerni et al. |
| 2009/0268202 A1 | 10/2009 | Wagner |
| 2009/0323061 A1 | 12/2009 | Novotny et al. |
| 2010/0220315 A1 * | 9/2010 | Morrell .............. G01N 15/1436 356/73 |
| 2010/0328657 A1 | 12/2010 | Dholakia et al. |
| 2012/0044493 A1 * | 2/2012 | Smart .................. G01N 15/1434 356/336 |
| 2012/0100521 A1 | 4/2012 | Soper et al. |
| 2014/0226158 A1 | 8/2014 | Trainer |
| 2015/0000595 A1 | 1/2015 | Gorbunov et al. |
| 2015/0062587 A1 * | 3/2015 | Shpaisman ........ G01N 15/1429 356/457 |
| 2015/0233814 A1 * | 8/2015 | Golovanevsky .......... F16F 7/01 356/244 |
| 2015/0259723 A1 | 9/2015 | Hartigan et al. |
| 2015/0260628 A1 | 9/2015 | Shamir |
| 2015/0276575 A1 | 10/2015 | Takeuchi et al. |
| 2016/0126081 A1 | 5/2016 | Gorbunov |
| 2016/0139013 A1 | 5/2016 | Gorbunov |
| 2016/0171686 A1 * | 6/2016 | Du ...................... G06T 7/0012 382/130 |
| 2016/0356711 A1 * | 12/2016 | Lumpkin .......... G01N 15/1434 |
| 2017/0059485 A1 | 3/2017 | Yamamoto et al. |
| 2017/0176312 A1 | 6/2017 | Shamir |
| 2017/0191924 A1 | 7/2017 | Pristinski |
| 2017/0198782 A1 * | 7/2017 | Rowlen .............. G01N 15/1436 |

(56) References Cited

U.S. PATENT DOCUMENTS

| | | | |
|---|---|---|---|
| 2017/0336328 A1* | 11/2017 | Gupta | G01N 21/8806 |
| 2018/0133744 A1 | 5/2018 | Gorbunov et al. | |
| 2018/0266938 A1 | 9/2018 | Chow | |
| 2018/0269250 A1 | 9/2018 | Chow | |
| 2018/0270434 A1 | 9/2018 | Chow | |
| 2018/0270435 A1 | 9/2018 | Chow | |
| 2018/0284008 A1 | 10/2018 | Kinishi et al. | |
| 2018/0313796 A1* | 11/2018 | Jeannotte | G01J 3/00 |
| 2018/0335376 A1* | 11/2018 | Ayliffe | H01J 49/0013 |
| 2019/0025214 A1* | 1/2019 | Rothberg | G01N 21/6408 |
| 2019/0250785 A1 | 8/2019 | Pandolfi et al. | |
| 2019/0277745 A1 | 9/2019 | Matsuda et al. | |
| 2019/0323943 A1 | 10/2019 | Knollenberg et al. | |
| 2019/0346345 A1 | 11/2019 | Scialo et al. | |
| 2020/0072724 A1 | 3/2020 | Knollenberg et al. | |
| 2020/0072729 A1 | 3/2020 | Lumpkin et al. | |
| 2020/0150017 A1 | 5/2020 | Bates et al. | |
| 2020/0150018 A1 | 5/2020 | Shamir | |
| 2020/0156057 A1* | 5/2020 | Tomaras | B01L 3/5635 |
| 2020/0158603 A1 | 5/2020 | Scialo et al. | |
| 2020/0158616 A1 | 5/2020 | Knollenberg et al. | |
| 2020/0240896 A1 | 7/2020 | Karasikov et al. | |
| 2020/0355599 A1 | 11/2020 | Rodier et al. | |
| 2021/0044978 A1 | 2/2021 | Michaelis et al. | |
| 2021/0063349 A1 | 3/2021 | Rodier et al. | |
| 2021/0223273 A1 | 7/2021 | Scialo et al. | |
| 2021/0381948 A1 | 12/2021 | Rodier et al. | |
| 2022/0057317 A1* | 2/2022 | Yamamoto | G01J 3/0221 |
| 2022/0397495 A1 | 12/2022 | Yates et al. | |
| 2022/0397510 A1 | 12/2022 | Yates et al. | |
| 2022/0397519 A1 | 12/2022 | Knollenberg et al. | |
| 2023/0009668 A1 | 1/2023 | Scialò et al. | |
| 2023/0087059 A1 | 3/2023 | Knollenberg et al. | |

FOREIGN PATENT DOCUMENTS

| | | |
|---|---|---|
| CN | 109642866 A | 4/2019 |
| EP | 1083424 | 3/2001 |
| EP | 1642113 | 4/2014 |
| JP | S57-037251 | 3/1982 |
| JP | H04188041 | 7/1992 |
| JP | H08-054388 | 2/1996 |
| JP | 2005536740 | 12/2005 |
| JP | 2011133460 | 7/2011 |
| JP | 6309896 | 4/2018 |
| WO | WO 98/50779 | 11/1998 |
| WO | WO 99/06823 | 2/1999 |
| WO | WO 2005/005965 | 1/2005 |
| WO | WO 2013/181453 | 5/2013 |
| WO | WO 2013/080209 | 6/2013 |
| WO | WO 2017203224 A1 | 11/2017 |
| WO | WO 2018/170232 | 9/2018 |
| WO | WO 2018/170257 | 9/2018 |
| WO | WO 2019/082186 | 5/2019 |
| WO | WO 2019/171044 | 9/2019 |
| WO | WO 2020/219841 | 10/2020 |
| WO | WO 2021/102256 | 5/2021 |

OTHER PUBLICATIONS

Bouhelier et al. (2003) "Near-field scattering of longitudinal fields," Applied Physics Letters 82(25): 4596-4598.
Bouhelier et al. (2003) "Near-Field Second-Harmonic Generation Induced by Local Field Enhancement," Physical Review Letters 90(1): 013903-1-013903-4.
Bouhelier et al. (2003) "Plasmon-coupled tip-enhanced near-field optical microscopy," J. of Microscopy 210: 220-224.
Durst et al. (1981) "Light scattering by small particles refined numerical computations," Report SFB 80/TM/195 (table of contents), 2 pp.
Durst et al. (1981) "Light scattering by small particles refined numerical computations," Report SFB 80/TM/195, English translation, 2 pp.

European Extended Search Report, dated Jul. 13, 2021, corresponding to EP 18871675.7—10 pp.
European Office Action, dated Jan. 22, 2009, corresponding to European Patent Application No. 04744956.6, 2 pp.
European Office Action, dated Feb. 16, 2012, corresponding to European Patent Application No. 04744956.6, 5 pp.
European Office Action, dated Sep. 24, 2013, corresponding to European Patent Application No. 04744956.6, 7 pp.
European Office Action, dated Oct. 8, 2020, corresponding to European Patent Application No. 12854152.1, 8 pp.
Friedmann et al. (1996) "Surface Analysis Using Multiple Coherent Beams," Electrical and Electronics Engineers in Israel, 537-540.
Friedmann et al. (1997) "Resolution enhancement by extrapolation of the optically measured spectrum of surface profiles," Appl. Opt. 36(8): 1747-1751.
Goldberg et al. (2002) "Immersion Lens Microscopy of Photonic Nanostructures and Quantum Dots," IEEE Journal of Selected Topics in Quantum Electronics 8(5): 1051-1059.
Hemo et al. (Jan. 1, 2011) "Scattering of singular beams by subwavelength objects," Applied Optics 50(1):33-42.
Ignatovich et al. (2006) "Real-Time and Background-Free Detection of Nanoscale Particles," Physical Review Letters 96(1): 013901-1-013901-4.
"Innovative on-Line Particle Analyzer," (Jun. 2012) Innovative Particle-Monitoring Technologies Poster, 1 pp.
International Search Report and Written Opinion, dated Feb. 26, 2021, corresponding to International Patent Application No. PCT/US2020/061493, 12 pages.
International Search Report and Written Opinion, dated Jul. 28, 2020, corresponding to International Patent Application No. PCT/US2020/029765, 11 pages.
International Search Report and Written Opinion corresponding to PCT/IL2018/051141, dated Feb. 21, 2019, 16 pages.
International Search Report and Written Opinion corresponding to PCT/IL2012/050488, dated Mar. 21, 2013.
International Preliminary Report on Patentability corresponding to PCT/IL2012/050488, dated Jun. 3, 2014.
International Search Report and Written Opinion corresponding to PCT/IL2004/000616, dated Nov. 12, 2004.
International Preliminary Report on Patentability corresponding to PCT/IL2004/000616, dated Oct. 24, 2005.
Japanese Search Report corresponding to Application No. 2014-544046, dated Jul. 28, 2016.
Jones (1999) "Light scattering tor particle characterization," Progress in Energy and Combustion Science 25(1): 1-53.
Matizen et al. (1987) "Formation of non-gaussian light beams with the aid of a spatially inhomogeneous amplitude filter," Soviet Journal of Quantum Electronics 17(7): 886-887.
"Nano-particle analysis using dark laser beam sensor," (Jun. 2014) Innovative Particle-Monitoring Technologies Poster, 1 pp.
Notification of Reason for Refusal corresponding to Korean Patent Application No. 10-2014-7017139, dated Nov. 22, 2018, 9 pp.
Notice of Allowance corresponding to Korean Patent Application No. 10-2014-7017139, dated Feb. 18, 2020, 3 pp.
Notice of Preliminary Rejection corresponding to Korean Patent Application No. 10-2014-7017139, dated Sep. 23, 2019.
Notification of Reasons for Refusal corresponding to Japanese Patent Application No. 2014-544046, drafted Sep. 26, 2016.
Notification of Reasons for Refusal corresponding to Japanese Patent Application No. 2014-544046, drafted Aug. 28, 2017.
Office Action (First) corresponding to Chinese Patent Application No. 201280059154.7, dated Jun. 17, 2015.
Office Action (Second) corresponding to Chinese Patent Application No. 201280059154.7, dated May 9, 2016.
Piestun et al. (1994) "Control of wave-front propagation with diffractive elements," Opt. Lett. 19(11):771-773.
Piestun et al. (1996) "Unconventional Light Distributions in three-dimensional domains," J. Mod. Opt. 43(7): 1495-1507.
Piestun et al. (1996) "Wave fields in three dimensions: Analysis and synthesis," J. Opt. Soc. Am. A 13(9): 1837-1848.
Piestun et al. (1998) "Pattern generation with extended focal depth," Appl. Opt. 37(23): 5394-5398.

(56) References Cited

OTHER PUBLICATIONS

Piestun (2001) "Multidimensional Synthesis of Light Fields," Optics and Photonics News 12(11): 28-32.
Piestun et al. (2002) "Synthesis of three-dimensional light-fields and applications," Proc. IEEE 90(2):222-244.
Search Opinion corresponding to European Patent Application No. 12854152.1, completed Jun. 2, 2015.
Shamir et al. (2011) "Singular beams in metrology and nanotechnology," Tribute to Joseph W. Goodman, SPIE 8122(1): 1-8.
Shamir (Jul. 2012) "Singular beams in metrology and nanotechnology," Optical Engineering 51(7): 073605-1-073605-8.
Shamir et al. (May 2013) "Novel particle sizing technology," 6 pp.
Spektor et al. (1996) "Dark beams with a constant notch," Opt. Lett. 21(7):456-458.
Supplementary Search corresponding to Chinese Patent Application No. 2012800591547, dated Apr. 28, 2016.
Weiner et al. (1998) "Improvements in Accuracy and Speed Using the Time-of-Transition Method and Dynamic Image Analysis for Particle Sizing," American Chemical Society, Chapter 8: 88-102.
European Partial Supplemental Search Report issued in European Application Serial No. 20889175.4 on Nov. 2, 2023.
Munster et al. (2002) "Interferometry in flow to sort unstained X- and Y-chromosome-bearing bull spermatozoa" Cytometry 47: 192-199.
European Search Report dated Jan. 29, 2024, corresponding to European Patent Application 20889175.4.

\* cited by examiner

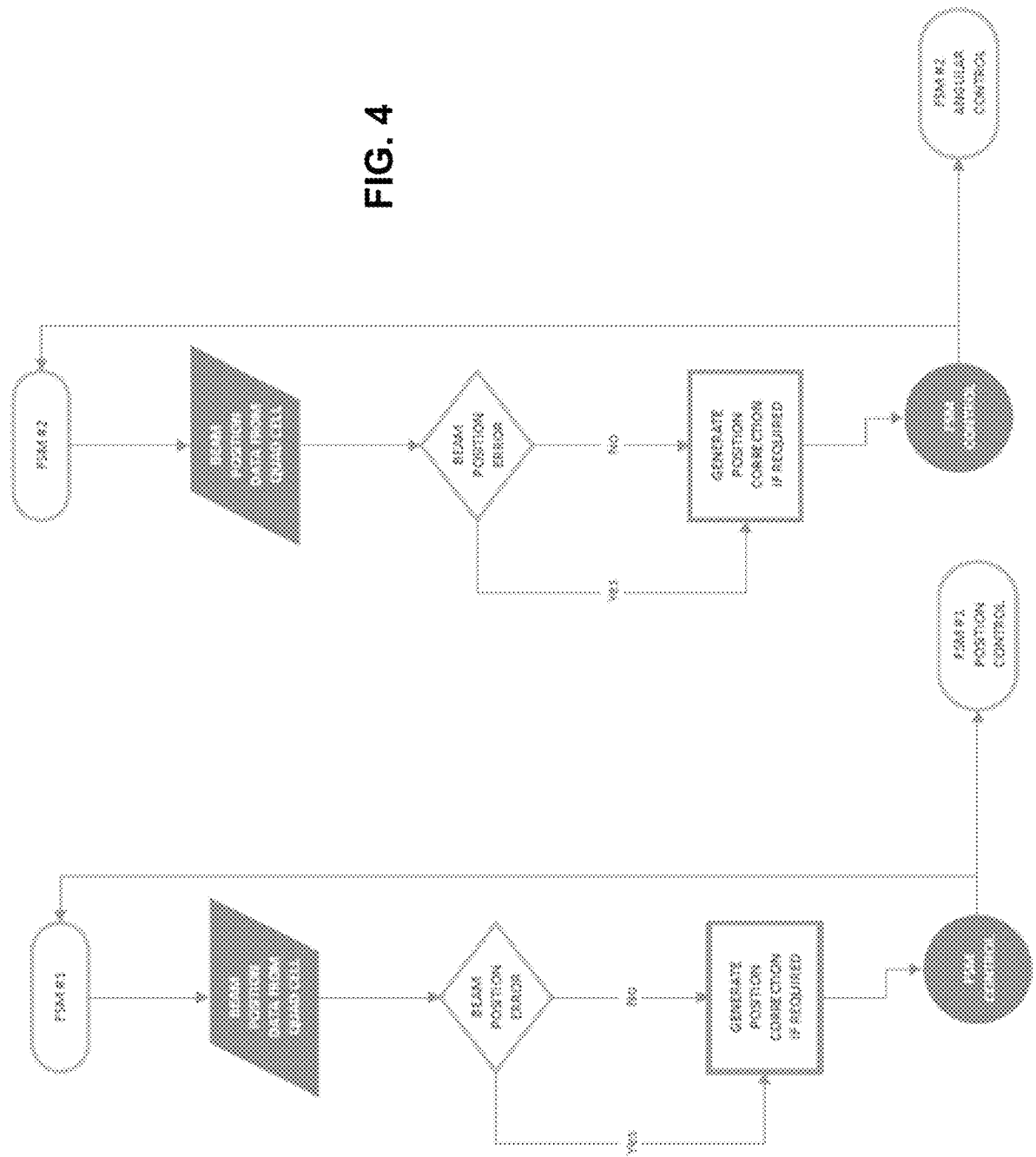

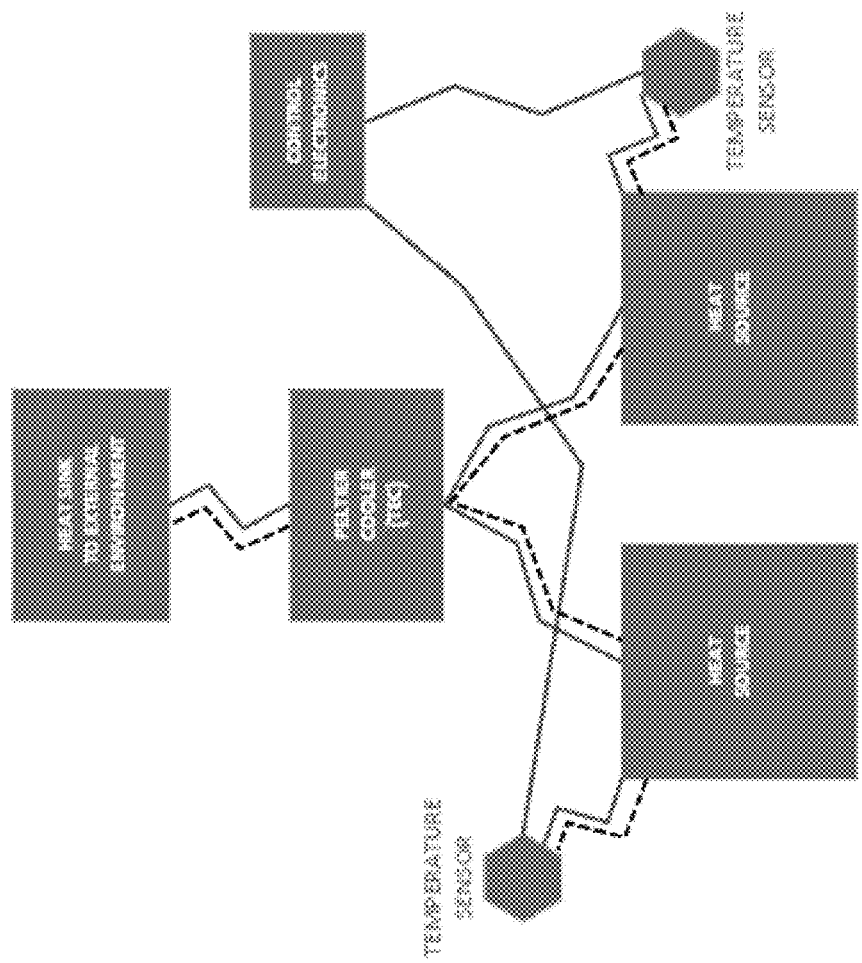
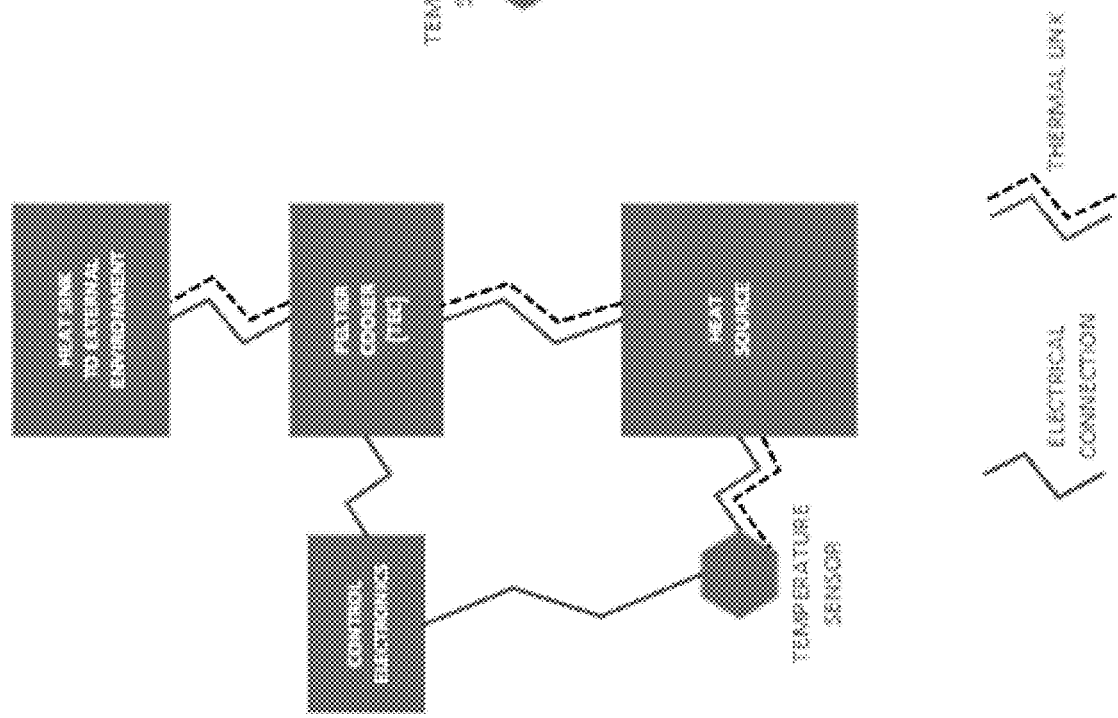
FIG. 6

ADVANCED SYSTEMS AND METHODS FOR INTERFEROMETRIC PARTICLE DETECTION AND DETECTION OF PARTICLES HAVING SMALL SIZE DIMENSIONS

CROSS-REFERENCE TO RELATED APPLICATIONS

This application claims the benefit of and priority to U.S. Provisional Patent Application No. 62/939,232, filed Nov. 22, 2019, which is hereby incorporated by reference.

BACKGROUND OF INVENTION

Advancement of technologies and industries requiring cleanroom conditions has resulted in a need for the detection and characterization of smaller and smaller particles. For example, microelectronic foundries pursue detection of particles less than 20 nm in size, and in some cases less than 10 nm in size, as particles of these dimensions may affect the increasingly sensitive manufacturing processes and products. Similarly, the need for aseptic processing conditions for manufacturing of pharmaceuticals and biomaterials requires accurate characterization of viable and non-viable particles to address compliance standard relating to health and human safety.

Typically, these industries rely on optical particle counters for detection and characterization of small particles. The ability to detect smaller particles requires new approaches for optical particle counting such as systems employing increasing laser powers, shorter excitation wavelengths and more complex techniques such as condensation nuclei counting, which in turn can dramatically increase the cost and overall complexity of devices capable of detection of nanometer scale particles. These new approaches can also require more frequent calibration and maintenance to provide the necessary reliability and reproducibility.

Various optical particle counters are known in the art, for example, scattered light optical particle counters are provided in U.S. Pat. No. 7,916,293 and transmission/extinction particle counters, including those utilizing structured beams and/or interferometry are provided in U.S. Pat. Nos. 7,746,469, 9,983,113, 10,416,069, US Patent Publication Nos. 2019/0277745 and US 20170176312, and PCT international Publication WO 2019/082186. Each of these references are hereby incorporated in their entirety and specifically to illustrate particle counter system components and configurations that are useful for the detection and characterization of small particles.

It can be seen from the foregoing that there is a need in the art for systems and methods that provide enhanced optically sensing particles having small size dimensions.

SUMMARY OF THE INVENTION

The present invention relates to interferometric detection of particles and optical detection of particles having size dimensions less than or equal to 100 nm. Systems and methods are provided exhibiting enhanced alignment and stability for interferometric detection of particles and/or optical detection of particles having size dimensions less than or equal to 100 nm. Systems and methods are provided that include compensation means for mitigating the impact of internal and external stimuli and changes in operating conditions that can degrade the sensitivity and reliability of particle detection via optical methods, including interferometric-based techniques and/or systems for optical detection of particles having size dimensions less than or equal to 100 nm. In embodiments, for example, systems and methods are provided with active and/or passive components, such as controllers, isolators and/or compensators that enhance operating tolerances of an optical particle detection system or method, including an interferometric particle detection system or method and/or system for optical detection of particles having size dimensions less than or equal to 100 nm. The present systems are useful, for example, for mitigating degradation of the performance of an optical particle counter for measurement of particles having size dimensions less than or equal to 100 nm and/or an interferometric particle counter, such as involving structured beam or heterodyne interferometric detection, with respect to aspects of an operating state or operating condition, such as internal or external sources of vibrations, acoustic waves, thermal energy, etc. or changes in ambient and/or operating conditions such as temperature, pressure, etc.

In an aspect, a particle detection system comprises a flow cell for flowing a fluid containing particles; an optical source for generating one or more beams of electromagnetic radiation such as one or more coherent beams of electromagnetic radiation; a beam shaping optical system for passing the one or more beams of electromagnetic radiation through the flow cell, thereby generating electromagnetic radiation scattered by the particles; at least one optical detector array for receiving electromagnetic radiation from said flow cell, wherein the optical source, beam shaping optical system and optical detector array are configured to allow for interferometric detection of the particles and/or optical detection of particles having at least one, and optionally all, size dimensions less than or equal to 100 nm; and wherein the system is configured such that at least one of a temperature, pressure, extent of vibrations, and extent of acoustic waves, or any combination of these, are each independently maintained to be within a selected tolerance, so as to so as to maintain a high signal-to-noise ratio during the detection of the particles, such as by interferometric detection of the particles and/or optical detection of the particles having size dimensions less than or equal to 100 nm.

In some embodiments, the systems and methods are for the detection of particles less than or equal 100 nm and employ a scattering-based method or system, a fluorescence-based method or system, an optical extinction-based method or system, an interferometric-based method or system, a condensation nuclei counting (CNC)-based method or system, and/or any combinations of these.

In an embodiment, the optical source, beam shaping optical system and optical detector array are configured to provide structured beam interferometric detection of the particles by passing a structured probe beam of coherent electromagnetic radiation through the flow cell. In an embodiment, the optical source, beam shaping optical system and optical detector array are configured to provide heterodyne interferometric detection of said particles by collecting off-axis scattered light and combining the off-axis scattered light scattered light with a reference beam to create the interferometric signal. In an embodiment, the optical source and optical detector array are configured to provide single or multiple beam interferometric detection of the particles including common path or differential path interferometric methods. In an embodiment, the optical source and optical detector array are configured to provide structured dark beam interferometric detection of the particles, such as a structured dark beam characterized by a spatial intensity profile having region of attenuated intensity, such as a centerline decrease in intensity. In an embodiment, the optical source and optical detector array are configured to provide Gaussian or non-Gaussian beam interferometric detection of the particles, for example by detection of both electromagnetic radiation transmitted through the flow cell and electromagnetic radiation scattered by the particle(s), which in some examples provides a self-correcting interferometric geometry provides benefits of being less sensitive to thermal effects that can change beam path lengths.

In an embodiment, the optical detector array is positioned in optical communication with the flow cell for receiving incident electromagnetic radiation transmitted through the flow cell and electromagnetic radiation scattered by the particle, for example, wherein the electromagnetic radiation scattered by the particle comprises forward scattered electromagnetic radiation. In an embodiment, the incident electromagnetic radiation transmitted through the flow cell and the electromagnetic radiation scattered by the particle undergo constructive and/or destructive optical interference, for example, thereby generating one or more diffraction patterns. In an embodiment, the optical detector array is provided at a scattering angle that is within 5 degrees of zero degrees relative to the optical axis of the incident beam, optionally for some applications at a scattering angle that is within 1 degree of zero degrees relative to the optical axis of the incident beam, optionally for some applications at a scattering angle that is within 0.5 degree of zero degrees relative to the optical axis of the incident beam, and optionally for some applications at a scattering angle that is within 0.1 degree of zero degrees relative to the optical axis of the incident beam. In an embodiment, the optical detector array is provided in optical communication with the flow cell for detecting the interaction of the particle and the electromagnetic radiation scattered by the particle with the illuminating wave front. In an embodiment, the optical detector array is provided so as to provide for differential detection.

Systems and methods of the invention provide interferometric detection and/or optical detection of particles having size dimensions less than or equal to 100 nm with improved tolerances with respect to internal or external stimuli and changes in ambient and/or operating condition(s). In an embodiment, the system provides interferometric detection of the particles and/or optical detection of particles having size dimensions less than or equal to 100 nm without significant performance degradation of the internal particle counting process when subjected to one or more of the following conditions: a change in temperature (T) up to 5° C. at a rate of less than 1° C./hr; a change in pressure (P) up to 300 mbar; a change in beam path length up to 10 mm; a change in beam focus position up to 2 mm; a change in beam power of up to 20%; vibration level I up to 200 microns/sec; a change in beam angle up to +/−5 degrees; a condition of laser noise up to <2% (RMS); a change in $M^2$ of laser up to <1.3; a change in linewidth of laser up to <100 MHz; a change in RH up to <50%; and controlling electric (line power) stability and noise.

Systems and method of certain embodiments include a controller component capable of maintaining alignment and stability during operation sufficient to provide accurate interferometric detection of particles in a fluid flow and/or optical detection of particles in a fluid flow having size dimensions less than or equal to 100 nm. In an embodiment, the system further comprises a controller operationally coupled to the flow cell, optical source, beam shaping optical system, optical detector array or any combination of these, the controller for compensating for changes in the system parameters in response to ambient conditions, internal stimuli, external stimuli or any combination of these. In an embodiment, the ambient conditions, internal stimuli or external stimuli are selected from the group consisting of change in temperature, change in pressure, vibrations, acoustic waves, or any combination of these.

In an embodiment, the controller is a beam alignment system for monitoring position of the one or more beams and actively controlling the positioning and/or alignment of the flow cell, optical source, beam shaping optical system, optical detector array or any combination of these so as to maintain a high signal-to-noise ratio during the interferometric detection of the particles and/or optical detection of particles having size dimensions less than or equal to 100 nm. In an embodiment, the beam alignment system provides for compensation for thermal expansion optical drift. In an embodiment, the beam alignment system provides for low frequency vibration compensation. In an embodiment, the beam alignment system provides real-time control of the positioning and/or alignment of the flow cell, optical source, beam shaping optical system, optical detector array or any combination of these to within 5 microradians or less at a frequency of 250 Hz or greater.

In an embodiment, the beam alignment system is a closed loop system capable of generating/receiving inputs and outputs for actively maintaining alignment and/or stability during interferometric detection of particles and/or optical detection of particles having size dimensions less than or equal to 100 nm. In an embodiment, the one or more photosensors are quadrature photosensors (e.g., positioned behind fold mirrors of the system) and the actuator system comprises one or more piezo-electric driven nanopositioners. In an embodiment, the photosensors provide inputs to a closed loop system and the actuator system provide outputs to maintain and stabilize the optical alignment during operation.

In an embodiment, the controller is an isolator or multiple isolators for isolating the flow cell, optical source, beam shaping optical system, optical detector array from changes in ambient conditions, internal stimuli, external stimuli of an operation environment or any combination of these. In an embodiment, the isolator is a dampening component capable of at least partially preventing transmission of vibrations from an external operation environment to the system. In an embodiment, the isolator is a dampening component capable of at least partially preventing transmission of vibrations originating from within the system itself, such as arising from transport of the fluid through the flow cell, from the pumps or other vibration generating components. In an embodiment, the dampening component is designed to reduce transmission of vibrations having a fundamental frequency of 60 Hz and above to less than 1% of an initial amplitude. In an embodiment, the dampening component comprises a dampened spring mechanism, at least two mass dampers or any combination of these.

In an embodiment, the controller is an active cooling component capable of controlling the temperature of the flow cell, optical source, beam shaping optical system, optical detector array or any combination of these. In an embodiment, the active cooling component is in thermal communication with the flow cell, optical source, beam shaping optical system, optical bench, optical detector array or any combination of these via conductive heat links. In an embodiment, the active cooling component comprises a thermoelectric cooler. In an embodiment, the thermoelectric cooler is provided not in thermal communication with an outer enclosure of the system. In an embodiment, the thermoelectric cooler is provided in thermal communication with a heat exchange structure to remove heat from the thermoelectric cooler and inject heat into an environment external to the system. In an embodiment, the heat exchange structure is a finned heat exchanger. In an embodiment, the thermoelectric cooler is purged with a dry gas to prevent humidity condensation of cooled side. In an embodiment, the thermoelectric cooler is purged with a dry gas to flow across hot side heat exchanger to enhance heat dissipation.

In an embodiment, the flow cell, optical source, beam shaping optical system, optical detector array or any combination of these are configured to provide passive isolation for compensating for changes in the system parameters in response to ambient conditions, internal stimuli and or external stimuli. In an embodiment, the passive isolation is provided by one or more of the following features: incorporation of one or more vibration isolators; incorporation of one or more adhesive layers in lenses; incorporation of one or more thermoset or thermoplastic mechanical restraints; reduced size and/or mass of optical source and components; incorporation of lens mounts having natural frequency greater than or equal to 150 Hz incorporation of flow cell mechanically isolated from optical source and components; coefficient of thermal expansion matched materials; and low coefficient of thermal expansion optical components.

In an embodiment, the source provides a coherent incident beam to the flow cell, such as a Gaussian incident beam. System and methods of the invention are also well-adapted for structured beam interferometric detection including dark beam interferometric detection. In an embodiment, the optical source comprises one or more shaping and/or combining optical elements for generating the one or more beams of electromagnetic radiation. In an embodiment, the one or more shaping and/or combining optical elements are diffractive elements, polarizing elements, intensity modulating elements, phase modulating elements or any combination of these. In an embodiment, the one or more beams of electromagnetic radiation comprises a structured, non-Gaussian beam. In an embodiment, the one or more beams of electromagnetic radiation comprises a dark beam. In an embodiment, the one or more beams of electromagnetic radiation comprises a beam characterized by one or more line singularities. In an embodiment, the one or more beams of electromagnetic radiation comprises an anamorphic beam. In an embodiment, the one or more beams of electromagnetic radiation comprises an anamorphic beam in a top hat configuration.

The systems and methods are compatible with a wide range of detectors and detector configurations. In an embodiment, forward looking on axis detector pair(s) are provided, for example at a scattering angle that is within 20 degrees of zero degrees. Differential detection may be used in the present systems and methods to provide a significant reduction of noise.

The systems and methods of the invention provide interferometric detection of particles and/or optical detection of particles having size dimensions less than or equal to 100 nm in flowing fluids, including detection, counting and sizing of single particles in a fluid flow. In an embodiment, the fluid is a liquid or a gas. In an embodiment, the system is for detection of particles in liquid chemicals. In an embodiment, the system is for detection of particles in ultrapure water. In an embodiment, the system is for detection of particles in high pressure gases. In an embodiment, the system is for detection of particles in air. In an embodiment, the system is for detection of particles on surfaces.

In an aspect, a method for detecting particles in a fluid comprises providing a flow of the fluid containing particles; generating one or more beams of electromagnetic radiation, such as one or more coherent beams of electromagnetic radiation, using an optical source; passing the one or more beams of electromagnetic radiation through the flow cell using a beam shaping optical system, thereby generating electromagnetic radiation scattered by the particles; and directing electromagnetic radiation from said flow cell onto an optical detector array using at least one optical detector array in optical communication with the flow cell, thereby allowing for interferometric detection of the particles and/or optical detection of particles having at least one, and optionally all, size dimensions less than or equal to 100 nm; wherein the flow cell, optical source, beam shaping optical system, optical detector array or any combination of these are configured and/or controlled so as to maintain a high signal-to-noise ratio during said detection of said particles. In some embodiments, for example, the flow cell, optical source, beam shaping optical system, optical detector array or any combination of these are configured such that one or more particle detection system parameters are independently maintained so as to maintain a high signal-to-noise ratio and/or to avoid significant performance degradation during detection of the particles, such as during the interferometric detection of the particles and/or optical detection of particles having size dimensions less than or equal to 100 nm, wherein such particle detection system parameters may comprise one or more of, optical beam path, optical source position and/or alignment, beam shaping system position and/or alignment, flow cell position and/or alignment, beam collection system position and/or alignment, detector position and/or alignment, or any combination of these.

In an embodiment of the methods the optical detector array is positioned in optical communication with the flow cell for receiving incident electromagnetic radiation transmitted through the flow cell and electromagnetic radiation scattered by the particle, for example, wherein the electromagnetic radiation scattered by the particle comprises forward scattered electromagnetic radiation. In an embodiment of the methods, the incident electromagnetic radiation transmitted through the flow cell and the electromagnetic radiation scattered by the particle undergo constructive and/or destructive optical interference. In an embodiment of the methods the optical detector array is provided at a scattering angle that is within 5 degrees of zero degrees relative to the optical axis of the incident beam, optionally for some applications at a scattering angle that is within 1 degree of zero degrees relative to the optical axis of the incident beam, optionally for some applications at a scattering angle that is within 0.5 degree of zero degrees relative to the optical axis of the incident beam, and optionally for some applications at a scattering angle that is within 0.1 degree of zero degrees relative to the optical axis of the incident beam. In an embodiment of the methods, the optical detector array is provided in optical communication with the flow cell for detecting the interaction of the particle and the electromagnetic radiation scattered by the particle with the illuminating wave front. In an embodiment the array detector is configured for differential detection.

In an aspect, a particle detection system comprises a flow cell for flowing a fluid containing particles; an optical source for generating one or more beams of electromagnetic radiation such as one or more coherent beams of electromagnetic radiation comprising a structured, non-Gaussian beam; a beam shaping optical system for passing the one or more beams of electromagnetic radiation through the flow cell, thereby generating electromagnetic radiation scattered by the particles; at least one optical detector array for receiving electromagnetic radiation from said flow cell, wherein said optical detector array is provided at a scattering angle that is within 0.5 degrees of zero degrees relative to the optical axis of the incident beam; wherein the optical source and positioned in optical communication with said flow cell for receiving incident electromagnetic radiation transmitted through said flow cell and electromagnetic radiation scattered by said particle, beam shaping optical system and optical detector array are configured to allow structured beam interferometric detection; and wherein the system is configured such that at least one of a temperature, pressure, extent of vibrations, and extent of acoustic waves, or any combination of these, are each independently maintained to be within a selected tolerance, so as to so as to maintain a high signal-to-noise ratio during the detection of the particles; wherein the system further comprises a controller operationally connected, such as to an optical bench comprising said flow cell, optical source, beam shaping optical system, optical detector array or any combination of these; said controller for compensating for changes in said system parameters in response to ambient conditions, internal stimuli, external stimuli or any combination of these; wherein said control is optionally one or more of: (i) a beam alignment system, such as quadrature photosensors positioned of said system and one or more piezo-electric-driven nanopositioners, for monitoring position of said one or more beams of electromagnetic radiation and actively controlling the positioning and/or alignment of the flow cell, optical source, beam shaping optical system, optical detector array or any combination of these so as to maintain a high signal-to-noise ratio during said detection of said particles; (ii) an isolator or multiple isolators, such as a dampening component capable of at least partially preventing transmission of vibrations from an external operation environment to said system or at least partially preventing transmission of vibrations originating from within the system itself, for isolating said flow cell, optical source, beam shaping optical system, optical detector array from changes in ambient conditions, internal stimuli, external stimuli of an operation environment or any combination of these and/or (iii) an active cooling component, such as a thermoelectric cooler, capable of controlling the temperature of elements of the system such as the flow cell, optical source, beam shaping optical system, optical detector array or any combination of these; and optionally wherein said controller is configured for closed loop feedback control.

In an embodiment, a method for detecting particles in a fluid comprises: (i) providing a flow of said fluid containing particles; (ii) generating one or more beams of electromagnetic radiation comprising a structured, non-Gaussian beam using an optical source; (iii) passing said one or more beams of electromagnetic radiation through said flow cell using a beam shaping optical system, thereby generating electromagnetic radiation scattered by said particles; and (iv) directing electromagnetic radiation from said flow cell onto an optical detector array wherein said optical detector array is provided at a scattering angle that is within 0.5 degrees of zero degrees relative to the optical axis of the incident one or more beams of electromagnetic radiation and positioned in optical communication with said flow cell for receiving incident electromagnetic radiation transmitted through said flow cell and electromagnetic radiation scattered by said particle, thereby providing for structured beam interferometric detection of said particles and/or optical detection of particles having size dimensions less than or equal to 100 nm; wherein the flow cell, optical source, beam shaping optical system, optical detector array or any combination of these are configured and/or controlled so as to maintain a high signal-to-noise ratio during said detection of said particles; wherein the method further comprises providing a controller operationally connected, such as to an optical bench comprising said flow cell, optical source, beam shaping optical system, optical detector array or any combination of these; said controller for compensating for changes in said system parameters in response to ambient conditions, internal stimuli, external stimuli or any combination of these; wherein said control is optionally one or more of: (i) a beam alignment system, such as quadrature photosensors positioned of said system and one or more piezo-electric-driven nanopositioners, for monitoring position of said one or more beams of electromagnetic radiation and actively controlling the positioning and/or alignment of the flow cell, optical source, beam shaping optical system, optical detector array or any combination of these so as to maintain a high signal-to-noise ratio during said detection of said particles; (ii) an isolator or multiple isolators, such as a dampening component capable of at least partially preventing transmission of vibrations from an external operation environment to said system or at least partially preventing transmission of vibrations originating from within the system itself, for isolating said flow cell, optical source, beam shaping optical system, optical detector array from changes in ambient conditions, internal stimuli, external stimuli of an operation environment or any combination of these and (iii) an active cooling component, such as a thermoelectric cooler, capable of controlling the temperature of elements of the systems such as the flow cell, optical source, beam shaping optical system, optical detector array or any combination of these; and optionally wherein said controller is configured for closed loop feedback control.

Without wishing to be bound by any particular theory, there may be discussion herein of beliefs or understandings of underlying principles relating to the systems, devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIG. 1A shows a single pass optical geometry and FIG. 1B shows a dual pass optical geometry.

FIG. 4. provides a flow diagram setting forth the sequence of steps and criteria for providing closed loop feedback control of optical alignment using the quad detectors signals as input and fast steering mirrors (FSM), to provide controlled optical alignment.

FIG. 6 provides a schematic of a system for detection of particles in a fluid flow with temperature control system.

DETAILED DESCRIPTION OF THE INVENTION

Figure 1A:
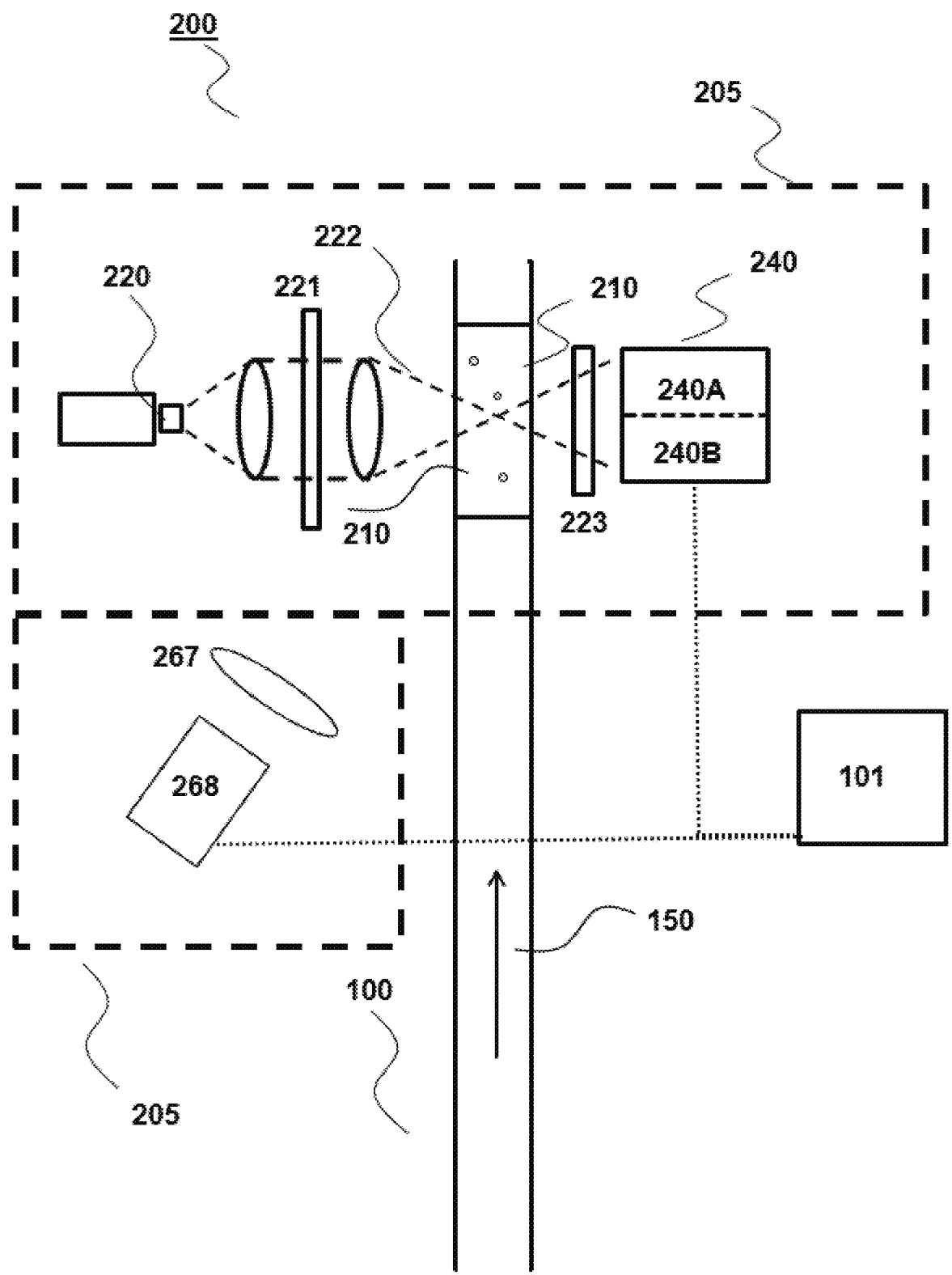
FIGS. 1A. and 1B provides schematics of system for interferometric detection of particles in a fluid flow with vibrational isolation of the optical bench.

In the following description, numerous specific details of the devices, device components and methods of the present invention are set forth in order to provide a thorough explanation of the precise nature of the invention. It will be apparent, however, to those of skill in the art that the invention can be practiced without these specific details.

In general, the terms and phrases used herein have their art-recognized meaning, which can be found by reference to standard texts, journal references and contexts known to those skilled in the art. The following definitions are provided to clarify their specific use in the context of the invention.

"Particles" refers to small objects which are often regarded as contaminants. A particle can be any material created by the act of friction, for example when two surfaces come into mechanical contact and there is mechanical movement. Particles can be composed of aggregates of material, such as dust, dirt, smoke, ash, water, soot, metal, oxides, ceramics, minerals, or any combination of these or other materials or contaminants. "Particles" may also refer to biological particles, for example, viruses, spores and microorganisms including bacteria, fungi, archaea, protists, other single cell microorganisms. In some embodiments, for example, biological particles are characterized by a size dimension (e.g., effective diameter) ranging from 0.1-15 μm, optionally for some applications ranging from 0.5-5 μm.

A particle may refer to a small object which absorbs, emits or scatters light and is thus detectable by an optical particle counter. As used herein, "particle" is intended to be exclusive of the individual atoms or molecules of a carrier fluid or sample medium, for example, water, air, process liquid chemicals, process gases, etc. In some embodiments, particles may be initially present on a surface, such as a tool surface in a microfabrication facility or production surface in a pharmaceutical fabrication facility, liberated from the surface and subsequently analyzed in a fluid. Some systems and methods are capable of detecting particles comprising aggregates of material having a size dimension, and optionally all size dimensions, such as average or effective diameter, average or effective length and/or average or effective width, greater than 5 nm, 10 nm, 20 nm, 30 nm, 50 nm, 100 nm, 500 nm, 1 μm or greater, or 10 μm or greater. Some embodiments of the present invention are capable of detecting particles having a size dimension, and optionally all size dimensions, such as average or effective diameter, average or effective length and/or average or effective width, selected from the range of 10 nm to 150 μm, optionally for some applications 10 nm to –10 μm, optionally for some applications 10 nm to –1 μm, and optionally for some applications 10 nm to –0.5 μm and optionally for some applications 10 nm to –250 nm The expression "detecting a particle" broadly refers to sensing, identifying the presence of, counting and/or characterizing a particle, such as characterizing a particle with respect to a size dimension, such as average or effective diameter, average or effective length and/or average or effective width. In some embodiments, detecting a particle refers to counting particles. In some embodiments, detecting a particle refers to counting particles corresponding to a size characteristic or a range of a size characteristic (e.g., a size bin), such as counting particles corresponding to one or more ranges of average or effective diameter, average or effective length and/or average or effective width. In some embodiments, detecting a particle refers to characterizing and/or measuring a physical characteristic of a particle, such as, cross sectional dimension, average or effective diameter, average or effective length, average or effective width shape, size, aerodynamic size, or any combination of these. In some embodiments, detection a particle is carried out in a flowing fluid, such as gas having a volumetric flow rate selected over the range of 0.05 CFM to 10 CFM, optionally for some applications 0.1 CFM to 5 CFM and optionally for some applications 0.5 CFM to 2 CFM. In some embodiments, detection a particle is carried out in a flowing fluid, such as liquid having a volumetric flow rate selected over the range of 1 to 1000 mL/min.

"Optical Particle Counter" or "particle counter" are used interchangeably and refer to a particle detection system that uses optical analysis and/or detection to detect, count and/or characterize particles, for example, by analyzing particles in a fluid flow and/or a fluid sample. Optical particle counters include liquid particle counters and aerosol particle counters, for example, including systems capable of detecting individual single particle(s) in a fluid flow, such as a flow of liquid or gas, and characterizing the number of particles per volume of fluid analyzed, for example, on the basis of a size criteria or ranges of size criteria, such as ranges of average or effective diameter, average or effective length and/or average or effective width (e.g., one or more size bin).

In some embodiments, optical particle counters provide a beam of electromagnetic radiation (e.g. via a laser or light emitting diode) into an interaction region, such as the analysis region of a flow cell, where the beam interacts with particles in a fluid flow. Illumination may involve focusing, filtering and/or shaping (e.g., elongation) the incident beam provided to the interaction region. Detection and/or characterization the particles may be achieved by detection and analysis of scattered, emitted and/or transmitted electromagnetic radiation from the interaction region. Detection may involve focusing, filtering and/or shaping electromagnetic radiation scattered, absorbed, obscured and/or emitted by the particle(s) on to one or more photodetectors such as an optical detector array. Various detectors for optical particle counters are known in the art, including for example, single detection elements (e.g., photodiode, photomultiplier tube, etc.), optical detector arrays (e.g., photodiode arrays, CMOS detectors, active-pixel sensors (APSs), charge-coupled devices (CCDs), a metal-oxide-semiconductor (MOS) detector, etc.), cameras, and may be implemented using various detector orientations as known in the art. Optical particle counters may incorporate differential detection, including split beam differential detection. Optical particle counters may include condensation particle counters, condensation nuclei counters and the like. When used in the context of a condensation particle counter, the optical particle counter portion refers to the detection system (e.g. the source of electromagnetic radiation, optics, filters, optical collection, detector, processor, etc.) for characterizing particles that have undergone upstream nucleation and/or growth.

In an embodiment, for example, an optical particle counter comprises a source for generating a beam of electromagnetic radiation, beam steering and/or shaping optics for directing and focusing the beam into a region where a fluid sample is flowing, for example, a liquid or gas flowing through a flow cell. A typical optical particle counter comprises a photodetector, such as optical detector array, in optical communication with a flow cell, and collection optics for collecting, shaping and/or imagining electromagnetic radiation which is scattered, transmitted and/or emitted by particles which pass through the incident beam. Particle counters may further comprise electronics and/or processors (e.g., implemented by firmware and/or software) for readout, signal processing and/or analysis of electrical signals produced by the photodetector including current-to-voltage converters, pulse height analyzers, signal filtering electronics, amplification electronics, etc. An optical particle counter may also comprise one or more fluid actuation systems, such as a pump, fan, blower or the like, for generating a fluid flow for transporting a fluid sample containing particles through the analysis region of a flow cell, for example, for generating a measurement characterized by a volumetric flow rate. In some embodiments, optical particle counters include a fluid actuation system for generating a selected flow rate, such as a flow rate selected over the range of 0.05 CFM to 10 CFM, optionally for some applications 0.1 CFM to 5 CFM and optionally for some applications 0.5 CFM to 2 CFM. In some optical particle counters, flow rates are generated for samples comprising one or more liquids include a flow rate selected over the range of 1 to 1000 m L/min.

The expression "interferometric detection of particles" refers to systems and methods using at least a component of optical interference to detect, count and/or characterize one or more particles. In some embodiments, coherent beams of electromagnetic radiation are superimposed or otherwise combined to cause optical interference for sensing, counting and/or determining a size characterization of a particle that interacts with at least a portion of the electromagnetic radiation. "Structured beam interferometric detection" refers to interferometric systems and methods wherein a structured probe beam of electromagnetic radiation having a non-Gaussian intensity distribution is passed through a flow cell containing a particle and light from the flow cell (e.g., transmitted light, scattered light (e.g., forward scattered light), etc.) is detected using an optical detector array to sense, count and/or characterize the particle. "Heterodyne interferometric detection" refers to refers to interferometric systems and methods wherein a probe beam of coherent electromagnetic radiation is passed through a flow cell, combined with a separate reference beam and the combined probe beam and reference beam is detected using an optical detector array to sense, count and/or characterize the particle. In some embodiments, particle counters are configured to provide heterodyne interferometric detection of said particles by collecting off-axis scattered light and combining the off-axis scattered light scattered light with a reference beam to create the interferometric signal.

Detecting and counting small particles (e.g., effective diameter less than 100 nm) in clean and ultraclean fluids in a manner that provides statistically significant data requires high signal-to-noise ratio (S/N). A high S/N ratio allows nanoparticles to be clearly detected above the noise floor. As used herein "statistically significant data" refers to detection of enough particles per unit time to be able to accurately assess contamination levels in the fluid. In some embodiments, high S/N does not necessarily relate to sizing accuracy directly. For example, in some optical particle counters the beam waist occupies a small fraction of the flow cell channel, and therefore, this approach monitors a subset of the total flow, such that it is possible for particles to pass through the edge of the beam where irradiance is less than the center. If a 50 nm particle passes through the outer edge of the beam, it may generate a signal similar to a 10 nm particle passing through the center of the beam. Therefore, it is possible form some optical particle counters to have high S/N and be able to detect 2 nm particles, while not having very good sizing accuracy. In some of the present optical particle counters and methods a goal is to be able to count enough particles to provide a quantitative, statistically sound, assessment of contamination levels in ultrahigh purity fluids in the shortest period of time. For example, the current state of the art particle counter may require up to 40 minutes to count enough particles to provide a statistically appropriate concentration (acceptable relative standard deviation) measurement when monitoring a state of the art ultrapure water system. By improving and maintaining a high S/N through the present systems and methods, the time interval needed to measure this minimum statistically acceptable particle counts can be reduced by 10× or more. This provides value as it allows a user to identify deviations from process control limits more quickly.

The expression "high signal-to-noise ratio" refers to a signal-to-noise ratio of an optical particle detection system sufficient for accurate and sensitive detection of particles in a fluid flow, including particles characterized by a small physical dimension (e.g., an effective diameter of less than or equal to 200 nm, optionally for some embodiments less than or equal to 100 nm and optionally for some embodiments less than or equal to 50 nm). In an embodiment, "high signal-to-noise ratio" refers to a signal-to-noise ratio sufficiently high to sense particles characterized by a small physical dimension, such as particles having an effective diameter as low as 20 nm, optionally for some applications a diameter as low as 10 nm and optionally for some applications a diameter as low as 1 nm. In an embodiment, "high signal-to-noise ratio" refers to a signal-to-noise ratio sufficiently high to accurately detect and count particles with a false detection rate of less than or equal to 50 counts/L, for example, for detection of particles having an effective diameter selected over the range of 1-1000 nm. In an embodiment, "high signal-to-noise ratio" refers to a signal-to-noise ratio sufficiently high to provide a minimum statistically acceptable particle count in a timeframe at least a factor of 10× less than in a conventional optical particle counter.

The expression "significant performance degradation of the particle counting process" refers to degradation in the capability of a particle detection system to detect and count particles in a flowing fluid. In some embodiments, a significant performance degradation of the particle counting process refers to greater than or equal to a 20% shift in detection threshold voltage in the smallest size channel. In some embodiments, a significant performance degradation of the particle counting process refers to an increase in false counting rate greater than or equal to 50 counts/L. In some embodiments, a significant performance degradation of the particle counting process refers to an increase in the time required to provide a minimum statistically acceptable particle count of a factor of 5 or greater, optionally for some embodiments, a factor of 10 or greater. In some embodiments, a significant performance degradation of the particle counting process, for example as a result of poorly managed noise sources, refers to a degradation of S/N, resulting in poor detectability of the smallest particles. For example, degraded S/N can make the detected signal from a 50 nm look like a signal from a 20 nm particle and can make a 20 nm particle signal be indistinguishable from the noise, resulting in lower detectability and fewer particles counted per unit time and/or the occurrence of false counts from the elevated noise levels.

The expression "differential detection" refers to techniques and systems using the differential signal from forward looking, on axis detector pair(s), for example, at a scattering angle that is within 0.5 degrees of zero degrees relative to the optical axis of the incident beam, optionally for some applications at a scattering angle that is within 0.1 degree of zero degrees relative to the optical axis of the incident beam, and optional is at or near zero degrees. A minimum of two pixels can be used to generate a differential signal (e.g., one upper (or top) and one lower (or bottom)), thereby forming a single pixel pair for differential detection. Alternatively, a plurality of pixels may be employed for each active detector area of a differential detector (e.g., the top active region and the bottom active region), such as a segmented differential detector comprising one or more pixel pairs, thereby using a plurality of pixel pairs, for example, wherein one pixel of each pixel pair corresponds to top active detector region and the other pixel of each pixel pair corresponds to the bottom active region. The number of pixel pairs may range, for example, from 1 to 500 pixels and, and optionally for some applications from 50-100 pixels. In some embodiment, the differential signal is generated by differentially adding signals from pixel pairs corresponding to different active regions of a segmented detector array, such as the top half and the bottom half. Differential detection may be used in the present systems and methods to provide a reduction of noise and thus enhanced signal-to-noise ratio. In some embodiments, for example, differential detection is used for detection of the combination of incident electromagnetic radiation transmitted through said flow cell and electromagnetic radiation forward scattered by one or more particle(s) in the fluid flow in the flow cell. In some embodiments, for example, the distribution of light incident has a power distribution that is balanced between the first and second active detection regions (e.g., upper half and lower half) of the differential detector, for example, such that the first and second active detection regions are characterized by incident radiant powers that are within 10%, optionally for some applications 5% and optionally for some application within 1%.

Differential detection includes techniques and systems having closed loop control, for example, based on an evaluation the noise amplitude of the differential signal when particles are not present (i.e., in the absence of scattering form the particle). In some embodiments, a steering mirror is used to adjust the incident beam position on the detector to reduce or minimize noise levels of the differential signal, which may occur when the beam power is uniformly split between the first and second active detector elements (e.g., upper and lower elements of the detector). Close loop control can also be achieved by translating the detector position and rotating the detector to align the beam and detector axes so as to reduce or minimize noise levels of the differential signal.

"Structured Beam" refers to a coherent beam of electromagnetic radiation (e.g., a laser) having a non-Gaussian spatial intensity distribution. Structured beams include beams characterized by an attenuated region, such as a dark beam, beams with a line focus with a dark line singularity, beams characterized by two or more discrete intensity lobes, etc. In an embodiment, a structured beam corresponds to a transverse mode, such as a TEM01. Structured beams include focused, synthesized, laser beams. Structured beams and dark beams may be generated by techniques known in the art including using an optical mask, modification of a laser cavity, combining multiple beams, spatial and/or polarization filters and other manipulations such as in an interferometric or polarization modification scheme.

"Structured beam detection" refers to systems and methods wherein a structured beam of electromagnetic radiation having a non-Gaussian intensity distribution is passed through a flow cell containing a particle and light from the flow cell (e.g., transmitted light, scattered light (e.g. forward scattered light, etc.) is detected using an optical detector array to sense, count and/or characterize the particle.

"Dark beam detection" refers to systems and methods wherein a dark beam of electromagnetic radiation, for example having a spatial intensity profile having region of attenuated intensity such as a centerline decrease in intensity, is passed through a flow cell containing a particle and is detected using an optical detector array to sense, count and/or characterize the particle.

"Beam propagation axis" refers to an axis parallel to the direction of travel of a beam of electromagnetic radiation.

"Optical communication" refers to components which are arranged in a manner that allows light to transfer between the components. Optical communication includes configurations where two elements are directly in optical communication wherein light travels directly between the elements and configurations where two elements are indirectly in optical communication wherein light travels between the elements via one or more additional optical elements, such as one or more lenses, mirrors, windows, beam splitters, optical fibers, phase masks, wave plates, beam combiners, optical filters, etc. or any combination of these.

"Optical axis" refers to a direction along which electromagnetic radiation propagates through a system.

"Optical detector array" refers to an optical detector capable of spatially resolving input signals (e.g., electromagnetic radiation) in two dimensions across an active area of the detector. An optical detector array is capable of generating an image, for example an image corresponding to an intensity pattern on the active area of the detector. In an embodiment, an optical detector array comprises an array of individual detector elements, also referred herein as pixels; for example: a two-dimensional array of photodetectors, a charge-coupled device (CCD) detector, a complementary metal-oxide-semiconductor (CMOS) detector, a metal-oxide-semiconductor (MOS) detector, an active pixel sensor, a microchannel plate detector, or a two-dimensional array of photodiodes.

"Optical source" refers to a device or device component for generating and/or delivering electromagnetic radiation to a sample. The term is not limited to visible radiation, such as by a visible light beam, but is used in a broad sense to include any electromagnetic radiation inclusive of visible radiation, ultraviolet radiation and/or infrared radiation. The optical source may be embodied as a laser or laser array, such as a diode laser, diode laser array, diode laser pumped solid state laser, LED, LED array, gas phase laser, solid state laser, to name a few examples. In some embodiments, an optical source is for generating one or more beams of electromagnetic radiation such as one or more coherent beams of electromagnetic radiation, for example, to generate a probe beam in an optical particle counter. In an embodiment, an optical source may include one or more components, such as a beam shaping system, phase mask, beam combiner, polarization controller, wave plate, or other component for generating a structured beam, such as a dark beam, for providing a probe beam in an optical particle counter.

In some embodiments, a beam shaping optical system is provided in optical communication with the optical source to receive electromagnetic radiation from the optical source, wherein the beam shaping optical system is configured to provide one or more beams of electromagnetic radiation to the flow cell, for example, one or more beams having selected intensity, directional and/or spatial characteristics. Beam shaping optical systems for certain embodiments may comprise one or more optical elements for focusing, expanding, steering, directing and/or combining light received from the optical source. Beam shaping optical systems for certain embodiments may comprise one or more lenses, reflectors, filters, expanders, polarization controllers, beam combiners, wave plates, prisms, phase masks, apertures, modulators, actuators or any combination of these. Beam shaping optical systems for certain embodiments are positioned and configured to provide a focused beam of electromagnetic radiation to the flow cell. Beam shaping optical systems for certain embodiments are configured to provide a high aspect ratio beam to the flow cell, such as a beam characterized by an aspect ratio selected from the range of 10:1 to 200:1.

The term "electromagnetic radiation" and "light" are used synonymously in the present description and refer to waves of electric and magnetic fields. Electromagnetic radiation useful for the methods of the present invention include, but is not limited to ultraviolet light, visible light, infrared light, or any combination of these having wavelengths between about 100 nanometers to about 15 microns.

A "high aspect ratio" beam refers to an optical beam, such as a laser beam including structured beam or dark beam, having an aspect ratio selected from the range of 10:1 to 200:1.

"Optical detection of particles having size dimensions less than or equal to 100 nm" refers to systems and methods capable of detecting a particle having at least one, and optionally all, size dimensions, such as effective or average diameter, effective or average length, effective or average width, etc., less than or equal to 100 nanometers. In some embodiments, "optical detection of particles having size dimensions less than or equal to 100 nm" refers to systems and methods capable of counting particles having particle having at least one, and optionally all, size dimensions less than or equal to 100 nm in a fluid flow, for example, as a function of time, flow volume, etc. In some embodiments, "optical detection of particles having particle having at least one, and optionally all, size dimensions less than or equal to 100 nm" refers to systems and methods capable of characterizing particles in a fluid flow on the basis of a size attribute, effective or average diameter, effective or average length, effective or average width, etc., for example by classifying a particle as corresponding to a size range (or size bin), for example, size ranges corresponding to, equal to or less than 100 nm, equal to or less than 90 nm, equal to or less than 80 nm, equal to or less than 70 nm, equal to or less than 60 nm, equal to or less than 50 nm, equal to or less than 40 nm, equal to or less than 30 nm, equal to or less than 20 nm, equal to or less than 10 nm, equal to or less than 5 nm, 1 nm-10 nm, 10 nm-20 nm, 20 nm-30 nm, 30 nm-40 nm, 40 nm-50 nm, 50 nm-60 nm, 60 nm-70 nm, 70 nm-80 nm, 80 nm-90 nm, 90 nm-100 nm or any combination of these ranges. In some embodiments, "optical detection of particles having size dimensions less than or equal to 100 nm" refers to systems and methods capable of detection of particles having at least one, and optionally all, size dimensions, such as such as effective or average diameter, effective or average length, effective or average width, etc., larger than 100 nm, in addition to detection of particles equal to or less than 100 nm. Example methods and systems for detection of particles less than or equal to 100 nm include, but are not limited to, optical scattering-based methods and systems, fluorescence-based methods and systems, optical extinction-based methods and systems, interferometric-based methods and systems, condensation nuclei counting-based methods and systems and any combinations of these.

The present systems and methods integrate active and/or passive components for preventing, mitigating and/or compensating the effects of internal or externals stimuli and/or change in operating conditions that can detrimentally impact particle detection using interferometric means and/or optical detection of particles having size dimensions less than or equal to 100 nm. Features of the present systems and methods include controllers, compensators and/or isolators that enhance the optical alignment and/or stability of a particle detection system during interferometric detection of particles and/or optical detection of particles having size dimensions less than or equal to 100 nm. In some embodiments, the particle detection systems have a "particle counter box within a box" geometry providing for vibration, acoustic and/or thermal control, such as to minimize changes in optical alignment during interferometric detection of particles and/or optical detection of particles having size dimensions less than or equal to 100 nm. In an embodiment, for example, an "optical bench", or components thereof, is physically, acoustically and/or thermally or isolated from external environment inputs by an enclosure. In an embodiment, for example, interferometric particle detection systems incorporate isolators, such as mesh isolators, providing vibrational stability, for example, by actively compensating for external or internal sources of vibration.

In an embodiment, for example, the particle detection system includes one more passive or active components that improve vibrational tolerance, as opposed to reducing vibration, such as by incorporating one or more of the following features or aspects: (i) using epoxy to integrate lenses and other optical components, (ii) reducing size/mass, (ii) keep lens mount at or near a natural frequency >150 Hz, (iii) implementing techniques for designing optical mounts and mounting optics, (iv) using optics/laser thermally and vibrationally isolated from enclosure, and/or (v) using a flow cell mechanically isolated from optics.

The invention can be further understood by the following non-limiting examples.

Example 1: Interferometric Detection with Vibrational Isolation

One of the significant sources of performance degradation in optical systems is vibration imposed either from the environment or intrinsic to the optical system. These inputs can either be periodic or random, with both having frequency and amplitude content. Cooling fans, active mechanisms, and general industrial environment contribute to the vibration sources and can have frequency content. More specifically industrial environments tend to have the first spectral peak of input at approximately 60 Hz with decreasing amplitude at higher harmonics. It is most common to have this first spectral peak cause degraded performance in optical systems, for example, for optical particle counting. The symptoms of degraded performance can be image blur both from in plane and defocus due to out of plane motions. Loss of boresight due to displacement of optical components can be a major performance impact occurring with vibration excitation if the natural frequencies of the component mount(s) fall on one of the harmonics.

In certain embodiments, for example, methods and components are used in the particle detection system to prevent loss of performance due to internal and environmental vibrations. The design of the system of some embodiments is based on isolating the optical system from the external environment. The "box within a box" design, for example, mounts the optical assembly on isolators that prevent transmission of external environmental vibration sources having frequency content is at or above the first fundamental mode of 60 Hz. Within the optical assembly some or all mounts are designed to have natural frequencies well above the fundamental modes of most vibration sources.

Another source of performance degradation in an optical assembly is motion of the optical components within their mounts due to either vibration inputs or thermal effects. In some embodiments, to reduce the impact of these effects some or all of the optics are constrained in mounts with adhesives to prevent any stick slip motion that can be induced by vibration sources or thermal effects. Additionally, the use of fans to control temperature is isolated from the optical assembly to effectively eliminate that vibration source.

A secondary source of vibration input is the coupling of external excitations from external sources to the optical assembly. These sources can be due to fluid flow in the test cell, electrical cables, or any connection that is required to pass from the external environment to the optical assembly. To isolate these sources, flexible links are installed between the external containment and the optical assembly. The flexible links act as isolators since their ability to transmit vibration is reduced or eliminated. Consequently, these isolated links cannot cause performance degradations on the optical system.

Vibration levels may be linked to system performance to establish general limits based on the sensitivity of the particle measuring system. For example, as the feature size of interest is decreased, so too is the allowable level of vibration imposed on the measurement tool.

Contrasting this to the general environmental vibration inputs (from all external sources) the need to isolate the particle measuring system from the external sources becomes evident.

FIG. 1A provides a schematic of a system for interferometric detection of particles in a fluid flow with vibrational isolation of the optical bench. A shown in FIG. 1A, particle detection system (200) includes a flow cell (210) for transporting flow of fluid (150) including particles (schematically depicted as circles within flow cell (210)), such as a gas or liquid flow having particles. Optical source (220), such as a laser source, generates electromagnetic radiation that is provided to beam steering and/or shaping system (221) for generating a probe beam (222), such as a structured beam such as a dark beam, that is provided to flow cell (210). Light from flow cell 210 including the port of the probe beam passing through flow cell (210) and light scattered (e.g. forward scattered) or emitted from the flow cell (210) is provided to an on-axis optical detector array (240), such as segmented 1D or 2D optical detectors (240A and 240B) comprising one or more pixel pairs, which is in operation communication with processor (101) to provide an output signal(s) to processor (101) such as a firmware or software implemented processor. Optical detector array (240) and/or processor (101) may be provide differential detection, for example in a configuration wherein individual segmented detector regions are each positioned over different intensity lobes of a structured beam, such as a dark beam. Optionally, collection and/or shaping optics (223) are provided between flow cell 210 and detector 240 to provide collection, shaping and/or filtering of light from flow cell 210.

One or more vibrational isolators (205) is provided to actively or passively isolate optical source (220), beam steering and shaping system (221), flow cell (210), optical detector array (240), collection and/or shaping optics (223) and/or any combination of these components from internal or external sources of vibrations. Integration of vibrational isolators (205) may also be used in the context of particle detection systems using heterodyne interferometric detection and or optical detection of particles having dimensions equal to or less than 100 nm.

Processor (101) receives and analyzes the output signals from the optical detector array (240), for example via generation and analysis of a differential signal combining (e.g., differentially adding, subtraction, etc.) of signals from segmented 1D or 2D optical detectors (240A and 240B) to provide detection of the particles, such as by counting and/or size characterization, for example, as a function of sample volume analyzed and/or time. In some embodiments, for example, an optical detector array (240) is provided at a scattering angle that is within 5 degrees of zero degrees relative to the optical axis of the incident beam, and optionally provided at a scattering angle that is within 0.5 degrees of zero degrees relative to the optical axis of the incident beam and optionally provided at a scattering angle that is within 0.1 degrees of zero degrees relative to the optical axis of the incident beam.

Also shown in FIG. 1A is an optional side scatter photodetector (268) and side scatter collection optics (267) which are positioned off-axis relative to the beam propagation axis of the probe beam (222) and the detector axis of optical detector array (240). Side scatter collection optics (267), such as one or more lenses and/or mirrors, is positioned to receive off-axis scattered light resulting from interaction with a particle in flow cell (210) and the probe beam. Side scatter collection optics (267) directs, and optionally images, at least a portion of collected scattered light on to side scatter photodetector (268) which is in operation communication to provide an output signal(s) to processor (101) for analysis to detect and/or characterize the particle(s). Optionally, one or more vibrational isolators (205) is provided to actively or passively isolate scatter collection optics (267), side scatter photodetector (268) and/or any combination of these from internal or external sources of vibrations.

Figure 1B:
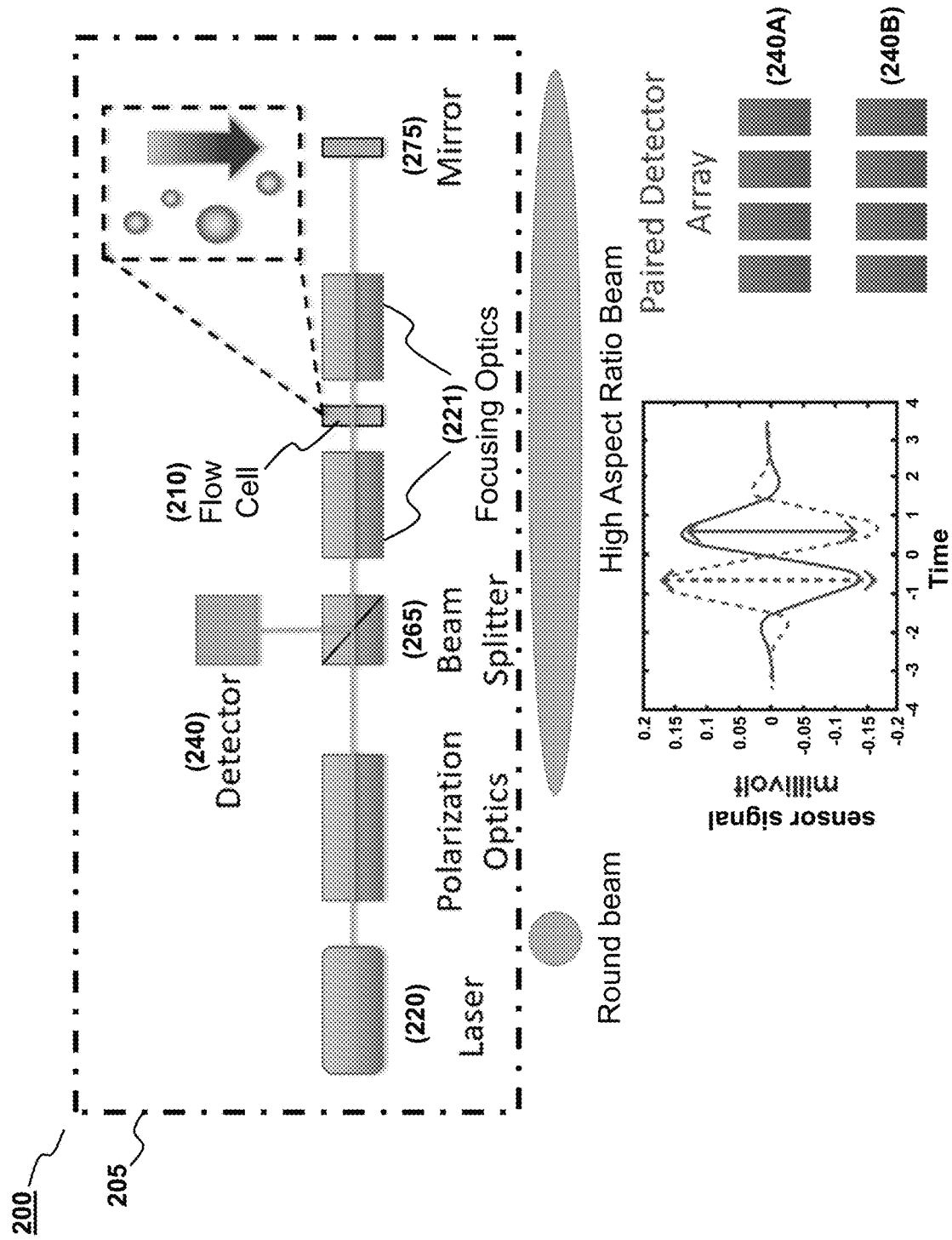

FIG. 1B provide a schematic of an alternative system for interferometric detection of particles in a fluid flow with vibrational isolation of the optical bench, wherein the optical geometry is set up to provide a dual pass optical geometry. As shown in FIG. 1B, the system (200) includes one or more vibrational isolators (205) provided to actively or passively isolate optical source (220), beam steering and shaping system (221), flow cell (210), beam splitter (265), mirror (275), optical detector array (240) or any combination of these from internal or external sources of vibrations. As shown in FIG. 1B, beam splitter (265) and mirror (275) are provided to provide a dual pass optical geometry. In the embodiment shown in FIG. 1B, the beam steering and shaping system (221) provides for a high aspect ratio beam provided to the flow cell (210) and optical detector array (240) is configured as a paired detector array. The depicted optical geometry allows for constructive and destructive interference of the beam which aids in sensitivity. The use of dual pass optical geometry and differential detection also aids in sensitivity. The use of a high aspect ratio beam increases the sample volume for which particles may be detected, which increase the amount of sample that can be monitored per unit time.

Optionally, the beam steering and shaping system (221) provides for a high aspect ratio beam, such as a beam characterized by an aspect ratio selected from the range of 10:1 to 200:1, provided to the flow cell (210) and optical detector array (240) is configured as a paired detector array including paired detector arrays (240A and 240B, expanded out from their position within detector (240) and schematically illustrated for clarity separately below the particle detection schematic next to an example signal corresponding to a particle detection event). Optical detector array (240) may be configured to provide differential detection, optionally wherein paired detector arrays (240A and 240B) are positioned over the intensity lobes of a structured beam such as a dark beam. In some embodiments, for example, said optical detector array is provided at a scattering angle that is within 5 degrees of zero degrees relative to the optical axis of the incident beam, and optionally provided at a scattering angle that is within 0.5 degrees of zero degrees relative to the optical axis of the incident beam.

FIG. 1B also shows a representative signal of the optical detector array (240) showing a signals from individual paired detector arrays (240A and 240B) as a function time (or particle trajectory through the beam) for a particle passing through the beam in the flow cell, wherein the solid line is the signal from detector array 240A and the dotted line is the signal from detector array 240B. As shown in FIG. 1B, the signals from individual paired detector arrays (240A and 240B) are each characterized by a minimum value and a maximum value and are inverted with respect to each other. Signals from individual paired detector arrays (240A and 240B) may be combined, for example via differential addition, subtraction, multiplication, etc., to provide a signal, such as a differential signal, that can be analyzed to provide accurate information as to the size, optical properties (e.g., refractive index) and composition of the particle.

Figure 1C:
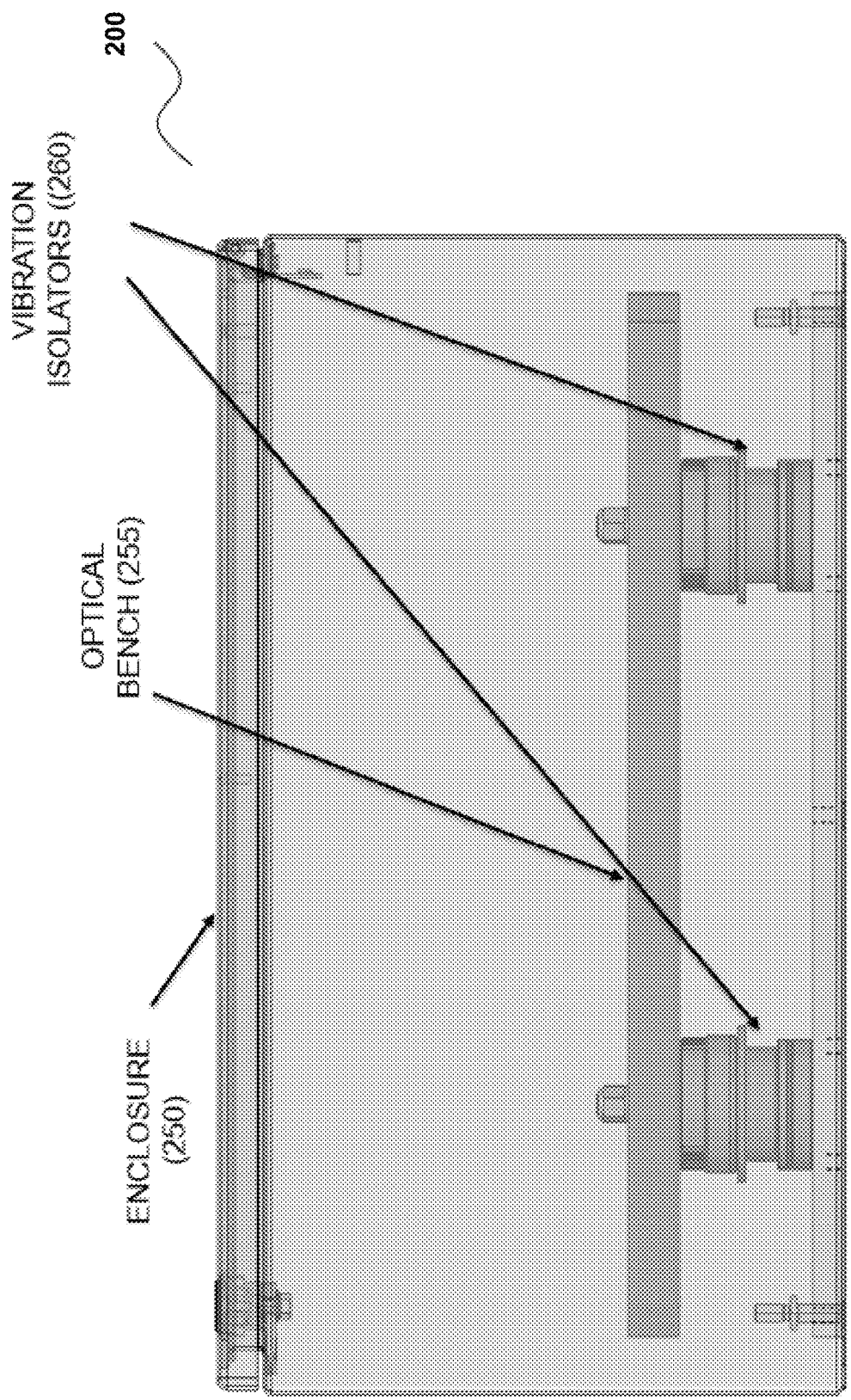
FIG. 1C. provides a schematic of an enclosure component of an optical particle counter for providing vibrational isolation of system components including the optical bench and components supported by the optical bench.

FIG. 1C provides a schematic of an enclosure component of an optical particle counter for providing vibrational isolation of system components including the optical bench and components supported by the optical bench. As shown in FIG. 1C, an enclosure (250) encloses the optical bench (255) and system components supported by the optical bench such as the optical source, beam steering and shaping system, flow cell, collection and/or shaping optics, optical detectors, beam splitters, phase masks, optical alignment systems, actuators, piezoelectric controllers, temperature controllers, etc. or any combination of these components (note: for clarity purposes the optical components are not shown in FIG. 1B). Vibrational isolators (260), such as dampeners and/compensators, are provided in operational communication with optical bench (255) such that transmission of vibrations from external sources is minimized or avoided, for example, so as to maintain high signal-to-noise ratio and avoid a degradation of performance of the optical particle counter.

Figure 2:
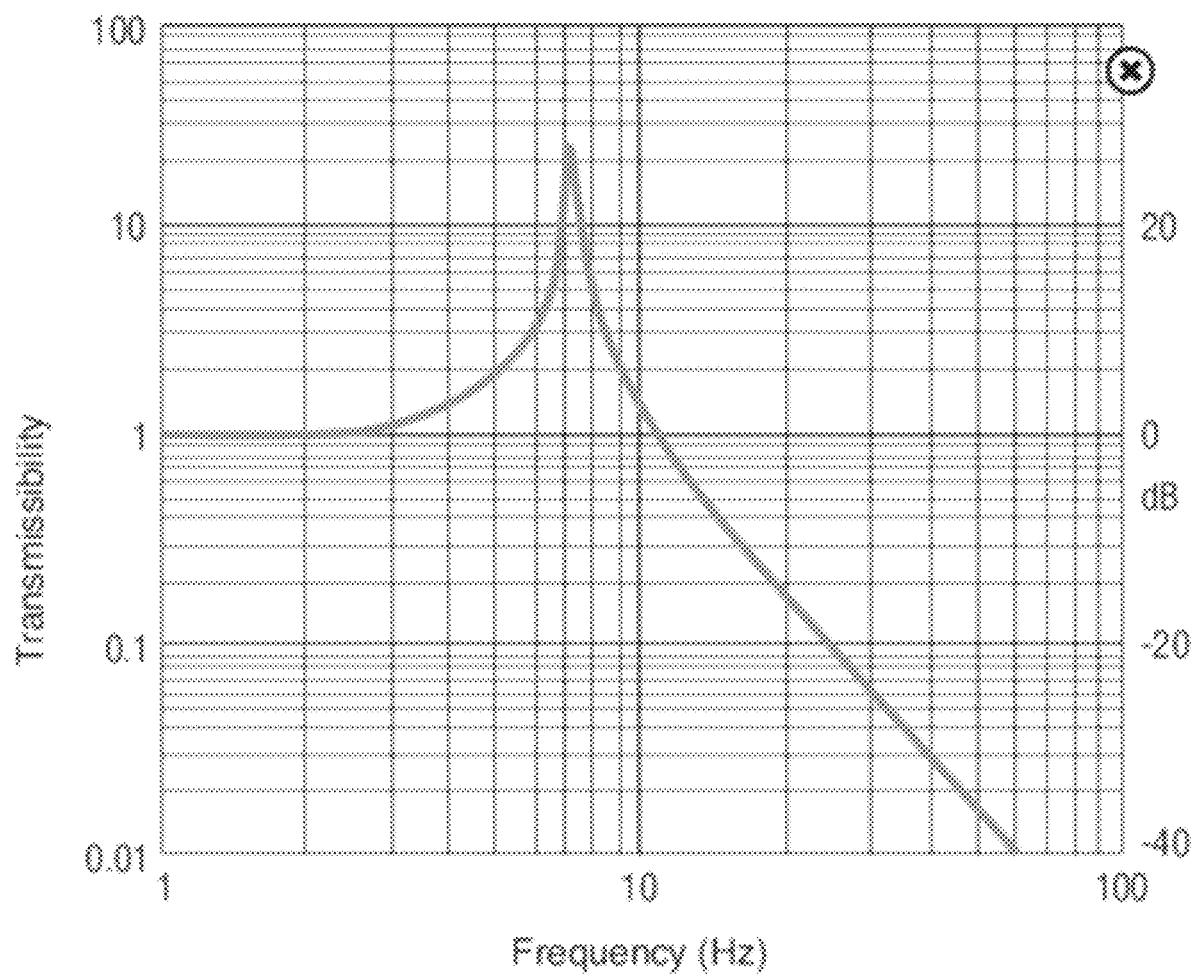
FIG. 2 provides a plot of transmissibility vs. frequency for an example vibration isolator.

In an embodiment, for example, a method used to isolate the internal measurement instrument from the external environment is to mount the "optical bench" on isolators, some of which are commercially available. The generic design of the isolator is a damped spring mechanism that is designed to only transmit vibration inputs below its natural frequency. Vibration input above the isolator natural frequency is damped or reduced. The amount of amplitude reduction is dependent on the design of the isolators. For example, commercial isolators are available that when properly implemented into the design can reduce the transmitted vibration by up to 90% of its original amplitude. FIG. 2 provides a plot of transmissibility vs. frequency for an example isolator. As shown in FIG. 2, below approximately 8 Hz (the natural frequency of the isolator) vibration input will be transmitted across the isolator. In this example, the transmission is approximately 1 and increases up to the natural frequency of the isolator (note peak at approximately 8 Hz). The amplitude of the transmitted vibration energy then decreases with frequency. As shown in FIG. 2, less than 1% at 60 Hz, the first and generally largest input frequency.

Example 2: Laser Beam Drift Correction

The laser beam bore sight may drift over time which in turn may adversely affect the performance of an interferometric particle detection system that relies on a stable pointing direction.

To address misalignment from laser beam drift and other sources, a laser beam steering subsystem may be incorporated into the systems using piezo driven fast steering mirrors (FSM) and sensors that give feedback for position error correction. A commonly used sensor is a quad-cell detector. The position (or error in position) on the sensor can calculated by comparing the levels of signals on the active pixels. The error can be deconvolved into coordinate position error. A second FSM can be utilized at some distance displaced from the first FSM and coupled with a similar position sensor to provide angular error correction. The sensors provide positional error signals that are then used to produce changes in the position of the fast steering mirror(s). The positional changes of the FSMs correct the displacement and angular errors of the laser beam.

Figure 3A:
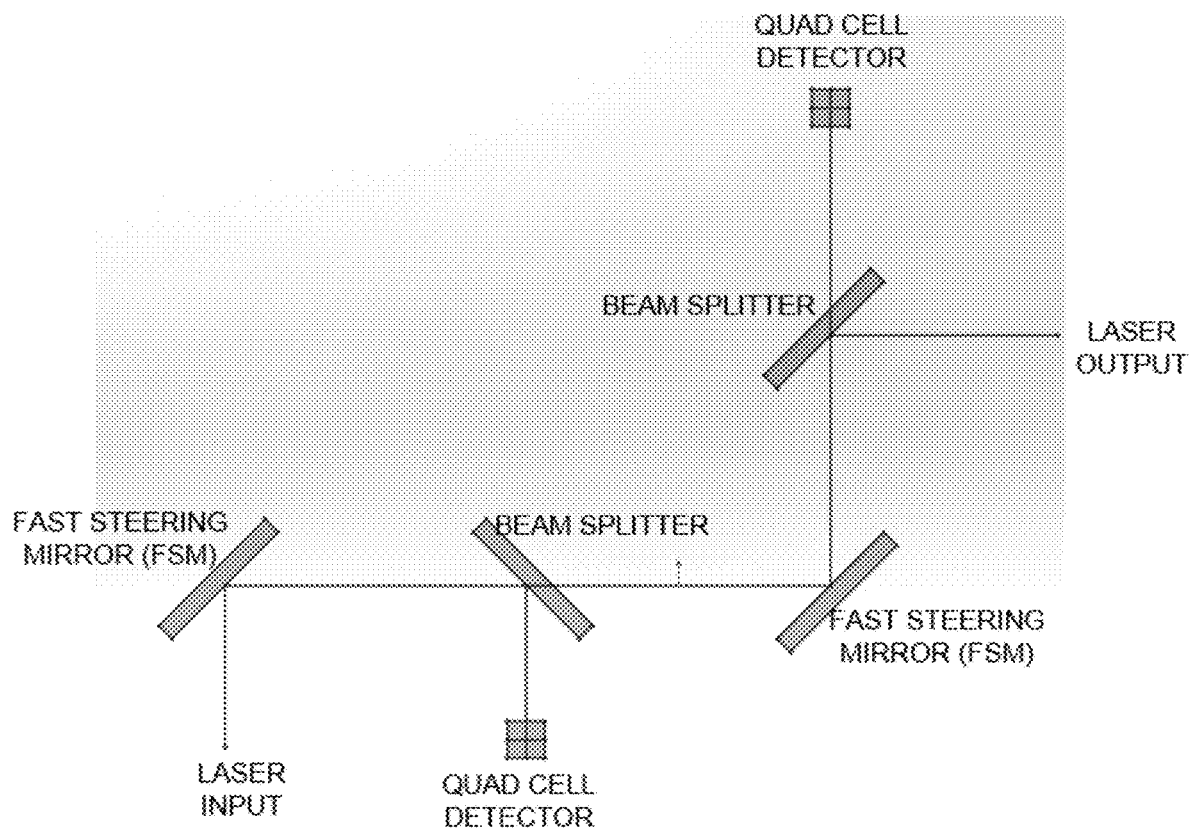
FIG. 3A and FIG. 3B provide schematics showing implementation alignment control systems using quadrature photosensors and piezo driven fast steering mirrors (FSM) for closed loop control of optical alignment.
Figure 3B:
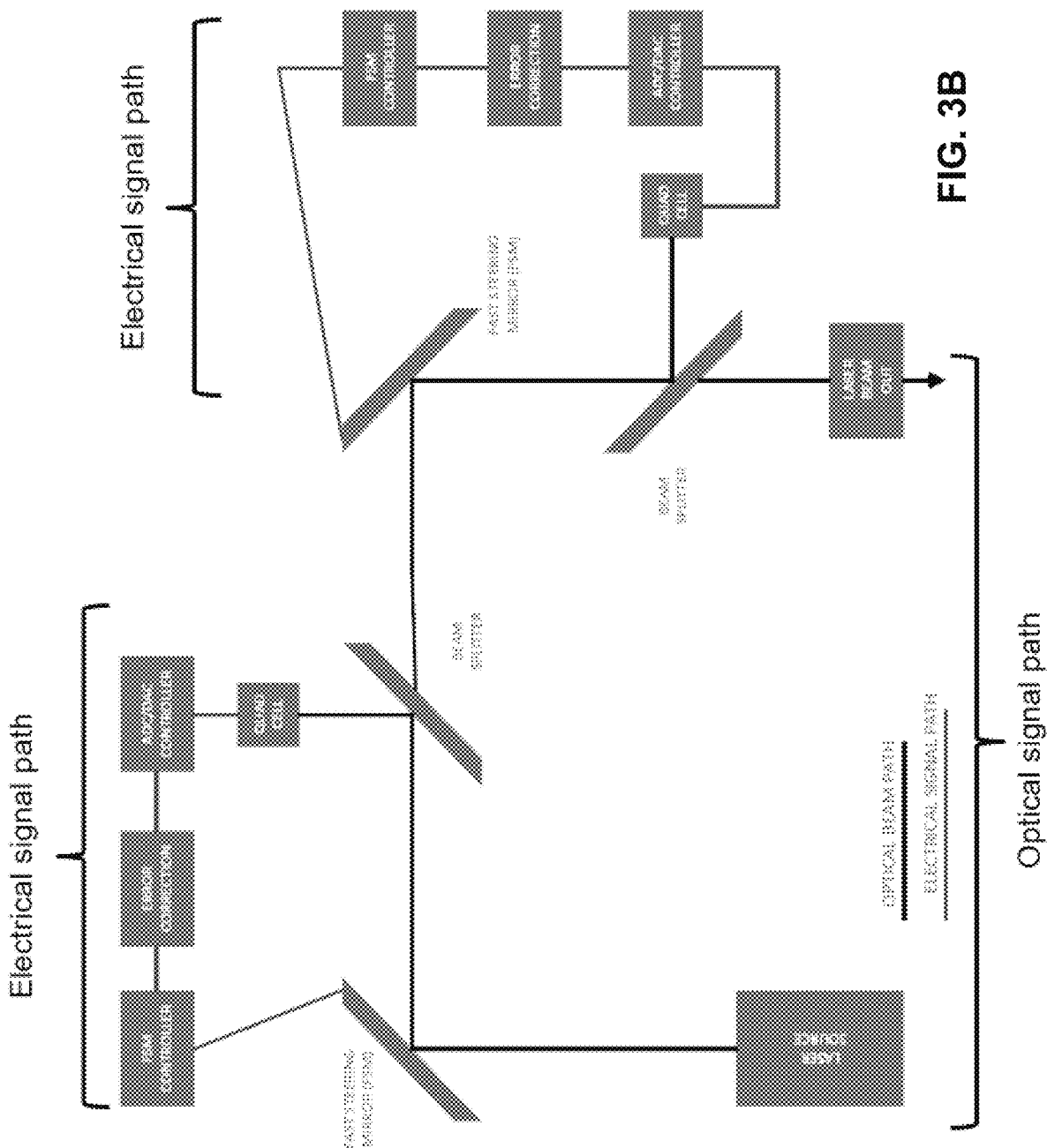

FIGS. 3A and 3B provide schematics showing implementation alignment control subsystems for closed loop control of optical alignment. For example, a photodetector comprising quadrature photosensors may be configured to provide a signal providing the inputs and piezo driven fast steering mirrors (FSM) may be provided to provide outputs for closed loop control of optical alignment.

FIG. 3A provides a schematic illustrating the optical beam path for an alignment control system comprising optical source, first fast steering mirror (FSM), first beam splitter, first quad cell detector, second fast steering mirror (FSM), second beam splitter, and second quad cell detector. As shown in FIG. 3A output from the laser source is provided as an incident beam to a first fast steering mirror. The second portion of the beam is directed to a first beam splitter that allows a portion of the beam to continue, and splits off a portion of the beam to a quad cell detector. The portion of the beam that continues through the beam splitter is incident upon a second fast steering mirror (FSM). The reflected beam is directed to a second beam splitter that splits the beam into two portions. One portion of the beam is output to the subsequent optics in the system. The other portion of the beam exiting the second beam splitter is directed to a second quad cell optical detector and detected.

Figure 3C:
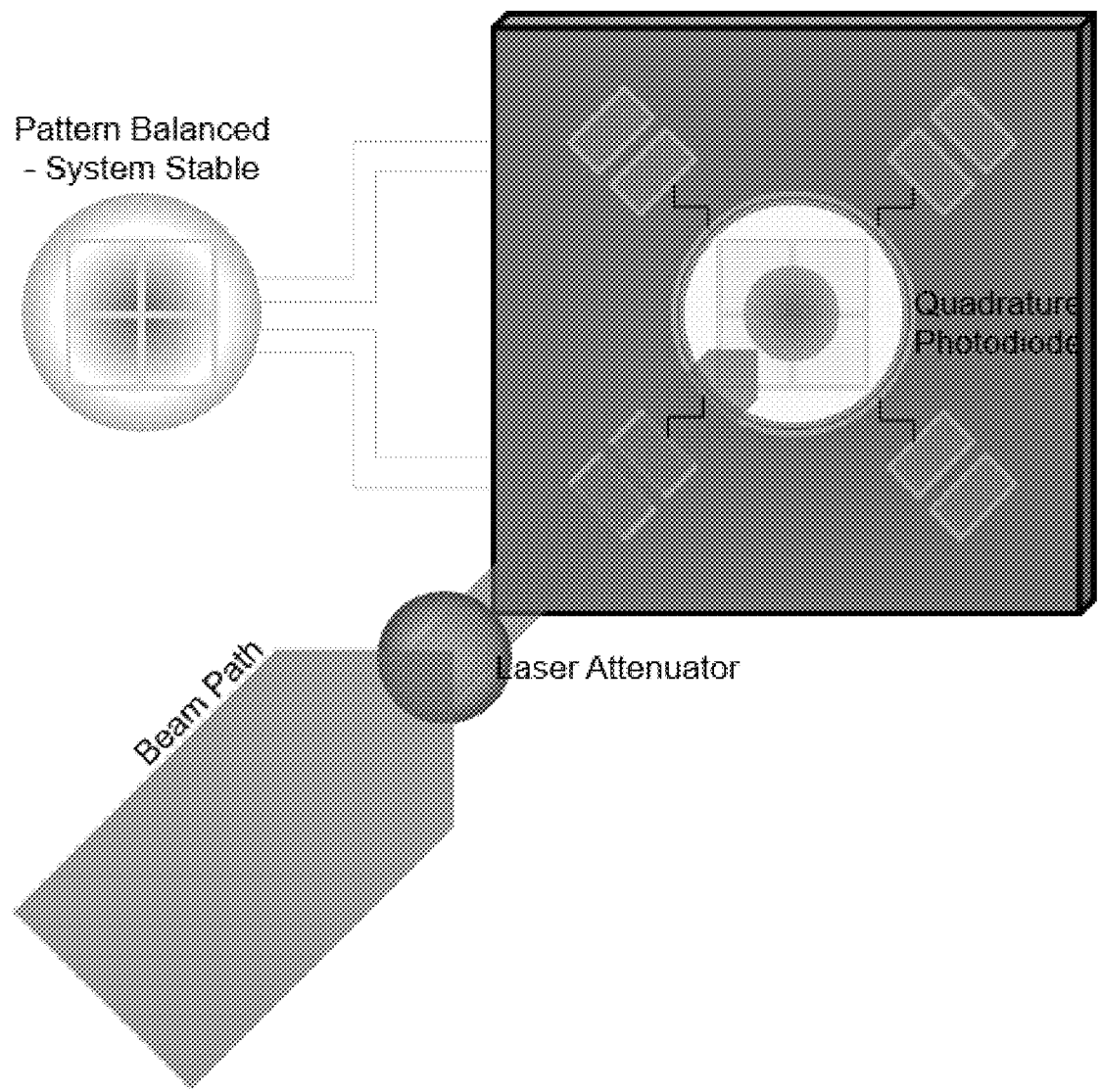
FIG. 3C provides a schematic showing example intensity pattern illustrating the system in a stable, aligned configuration.
Figure 3D:
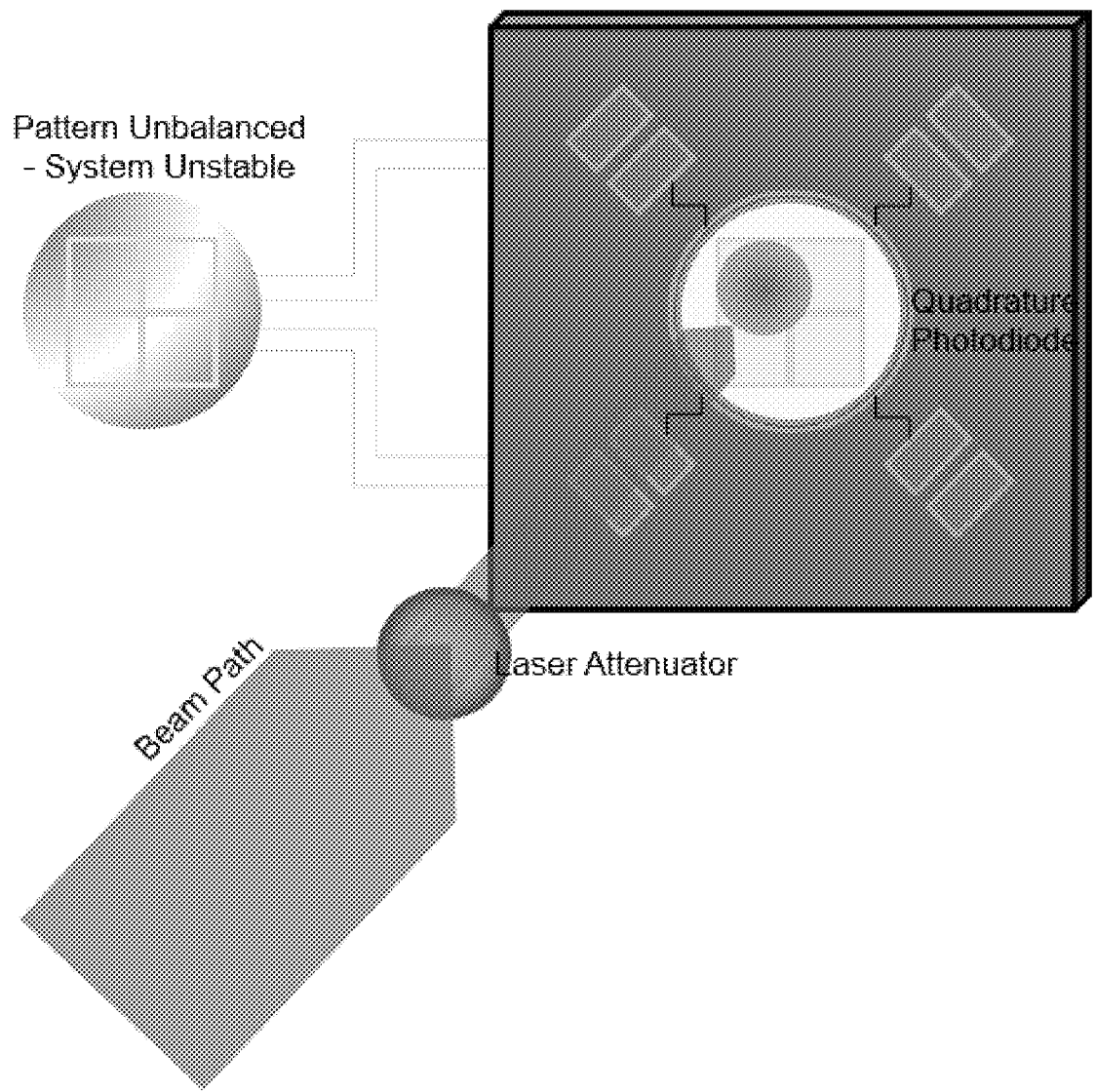
FIG. 3D provides a schematic showing example intensity pattern illustrating the system in an unstable, misaligned configuration.

FIG. 3B provides a schematic adding in the electrical signal path for an alignment control system similar to that shown in FIG. 3A. As shown in FIG. 3A, signals from the first and second quad cell optical detectors are individually provided to ADC/DAC controller, error correctors and FSM controller components. These components are configured to independently process and analyze signals from first and second quad cell detectors and generate control signals to actuate the first and second fast steering mirrors, thereby providing feedback control of the overall optical alignment. Also shown in FIG. 3B is the optical beam path. FIG. 3C provides a schematic showing example intensity pattern illustrating the system in a stable, aligned configuration. FIG. 3D provides a schematic showing example intensity pattern illustrating the system in an unstable, misaligned configuration. By monitoring the intensity pattern quadrature detector, therefore, changes in the optical alignment may be detected and monitoring. Such detected changes may further serve the basis of inputs for closed loop control of optical alignment.

FIG. 4 provides a flow diagram setting forth the sequence of steps and criteria for providing closed loop feedback control of optical alignment using the quad detectors signals as input and fast steering mirrors (FSM), to provide controlled optical alignment. The left panel shows the signal analysis and control processes for the first fast steering mirror (FSM) and the right panel shows the signal analysis and control processes for the second fast steering mirror (FSM). As shown in FIG. 4, beam position data is provided from the quad cell detector and analyzed to identify and or characterize the occurrence of a beam position error. If a beam position error is identified, a signal is provided to the fast steering mirror to generate position correction if required. The sequence shown in FIG. 4 is repeated to provide continual monitoring and correction of optical alignment.

In an embodiment, for example, if a mirror is used in the light path, the mirror coating may be designed to pass a small amount of the light incident upon it. This transmitted beam could impinge on the center of a quad detector. If the beam deviates from its nominal pointing direction, then the amount of illumination on each of the quadrants of the detector would change. The change in detector illumination could constitute an error signal serving to trigger fine correction motors or the like to restore the original distribution of light on each of the quadrants and thereby restore the intended beam direction.

Alternatively, a beam-sampling window which is only partially reflective could be placed in the beam and the reflected light could be directed onto a quad detector. If a change occurs in the distribution of light on the quad detector a signal could be generated to restore the placement of the primary beam on its target. One way might be to tip another window in the beam to laterally translate the transmitted beam and restore its intended placement.

Example 3: Interferometric Detection with Temperature Control

The thermal stability constraints of an interferometric particle detection system may be driven fundamentally by the optical performance requirements. There are multiple aspects of thermal instability that can impact the function of the optical system. The key parameters of temperature stability are thermal gradients, and overall magnitude of temperature change. The heat sources that impact the system performance include thermal dissipation from optical elements and electronics and external heat input from the environment. Both sources can lead to temperature changes inside the particle detection system that can degrade performance. As described in Example 1, the sensitivity of the instrument gives an indication of the level of temperature change that can be allowed without impacting performance.

Overall temperature excursions change the length of the plate as a function of the length scale, the temperature difference, and the Coefficient of thermal expansion of the material. The equation is shown below:

$$d = a\, L\, \Delta T$$

Where:
  d=overall change in length
  a=Coefficient of thermal expansion of the material
  L=Length of part
  $\Delta T$=Temperature change.

Figure 5:
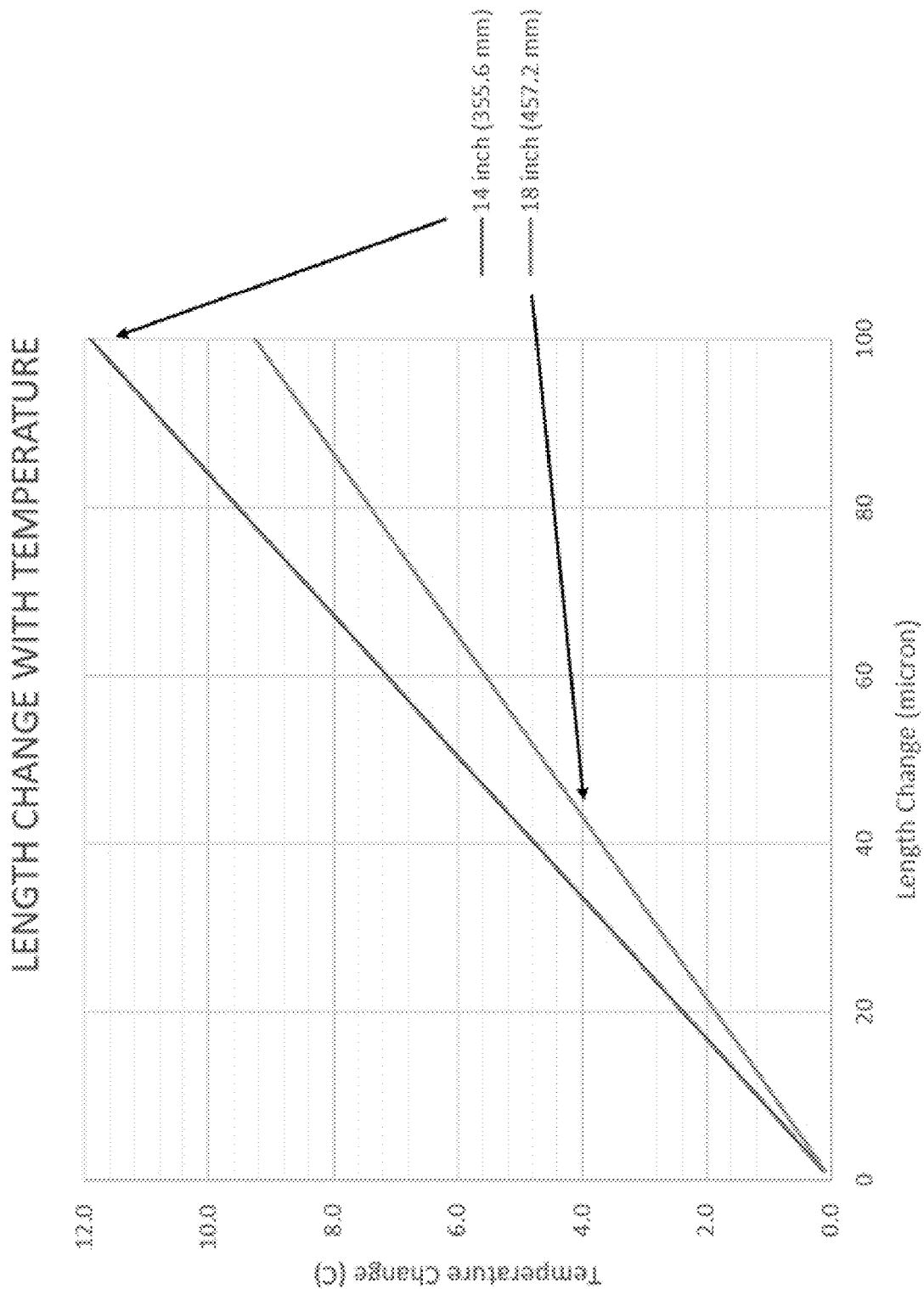
FIG. 5 provides a graph of temperature change vs length change over a range of interest (e.g., length and width of optical bench).

FIG. 5 provides a graph of temperature change vs length change over a range of interest (e.g., length and width of optical bench). As shown in FIG. 6, for a nominal optical tolerance (+/−0.025 mm), the allowable temperature change is on the order of 3° C. Generally, this is the maximum allowable tolerance level for spacing and alignment between many common optical components. There are sections of the optical system where the positional tolerance is on the order of +/−0.013 mm, further restricting the optimum performance temperature envelope.

The use of fans in interferometric particle detection systems, which is the general method for temperature control, can cause vibration and convective gradients in air inside the system. The pressure and temperature gradients change the refractive index of the air and degrade the optical performance. In particular, these temperature gradients are turbulent in nature and consequently have no constant effect that could be canceled out through data manipulation.

To provide thermal control embodiments of the interferometric particle detection system of certain embodiments incorporate active cooling components (e.g., Thermo-Electric Coolers (TECs), etc.) located on the outer enclosure of the system. These cooling mechanisms are equipped with heat exchange structures and mechanisms (e.g., finned heat exchangers, gas purges, etc.) that remove the waste heat from the cooling mechanisms and inject it into the external environment. The cooling mechanisms are connected to the internal components of the system with conductive heat links, or heat pipes. This method produces a micro-environment that is separate from both the external environment and has mitigated the effects of any internal heat sources. Consequently, the system performance is more stable than conventionally cooled systems that utilize internal cooling fans.

FIG. 6 provides a schematic of a system for interferometric detection of particles in a fluid flow with temperature control system. As shown in FIG. 6, Peltier cooler(s) are provided: (i) in thermal communication via thermal links to heat source(s), heat sink(s) and temperature sensor(s) and (ii) in electronic communication via electrical connections to control electronic(s) and temperature sensor(s). The schematics show thermal and electrical connections for controlling the temperature in connection with a heat sources, such as optical components, electrical components and/or mechanical components of an optical particle counter. The temperature controllers shown in FIG. 6 may be provided as modular components that are individually thermally coupled to heating sources corresponding to individual heat producing components of the optical particle counter, such as optical components (e.g., lasers, mirrors, flow cell, detectors, lenses, etc.), electronic components (e.g., processors, controllers, actuators, etc.) or mechanical components (e.g., fans, pumps, etc.). The number of Peltier coolers and/or thermal links is dependent on the number of heat sources and cooling capacity of the Peltier coolers.

Without thermal controls of critical components within a particle counter, the system may not function properly. For example, optics can become misaligned with temperature changes above 3° C. (degrees Celsius). Some components, such as the laser, require active cooling to remove the heat generated during operation. While chillers or liquid heat exchangers are effective for cooling lasers, they introduce the potential for vibration/noise that can have deleterious effects on the ultra-sensitive measurement, as well as increase the footprint of the entire system, which is undesirable.

Thermoelectric cooler (TEC) modules, also known as Peltier coolers, provide an alternative thermal management strategy for highly sensitive particle counters. This technology is comprised of two semiconductor materials, differing by electron density, sandwiched between thermally conductive plates. An applied voltage to the TEC creates a temperature difference between the plates, to enable cooling. When placed in direct contact with the inner or outer walls of the particle counter assembly, and/or individual components, including the laser and detector, the TEC can manage the temperature of the system.

Advantages of the thermal control with the TEC include: compact size and elimination of coolant and space required for chilling system; simplistic design without moving parts that enables long lifetime of the TEC device.

Example 4: Liquid Phase Particle Counter with Vibrational Isolation and Active Temperature Control This example provides a liquid phase particle counter system with vibrational isolation and active temperature control for detection of particles having size dimensions less than or equal to 100 nm, optionally less than or equal to 50 nm and optionally less than or equal to 20 nm, in a liquid flow, such as a flow of ultrapure water and/or other process liquid(s). The system includes a flow cell for passing the fluid flow having particle(s). A probe beam from an optical source, such as a laser source, is shaped by beam shaping optics (e.g., by focusing, elongating, etc.) and directed on to the flow cell containing the fluid flow, wherein interaction(s) of the probe beam and a particle(s) in the fluid flow generates scattered electromagnetic radiation. A portion of the scattered electromagnetic radiation from the flow cell is collected and directed onto a photodetector such as a detector array, which generates output signals corresponding to detection of scattered light from the flow cell. Analysis of the output signals, for example via a processor, such as firmware and/or software implemented processer, is used to identify and count occurrences of a particle detection event and characterizes the detected particle in terms of a size characteristic, such as an effective or average diameter or a classification of the particle corresponding to a size range (e.g., less than a particular size or within a range of sizes), for example via a pulse analysis method such as pulse height analysis, pulse area analysis, etc. By monitoring scattered light from the flow cell a count of detected particles is obtained, for example, as a function of time and/or volume of fluid analyzed.

Figure 7:
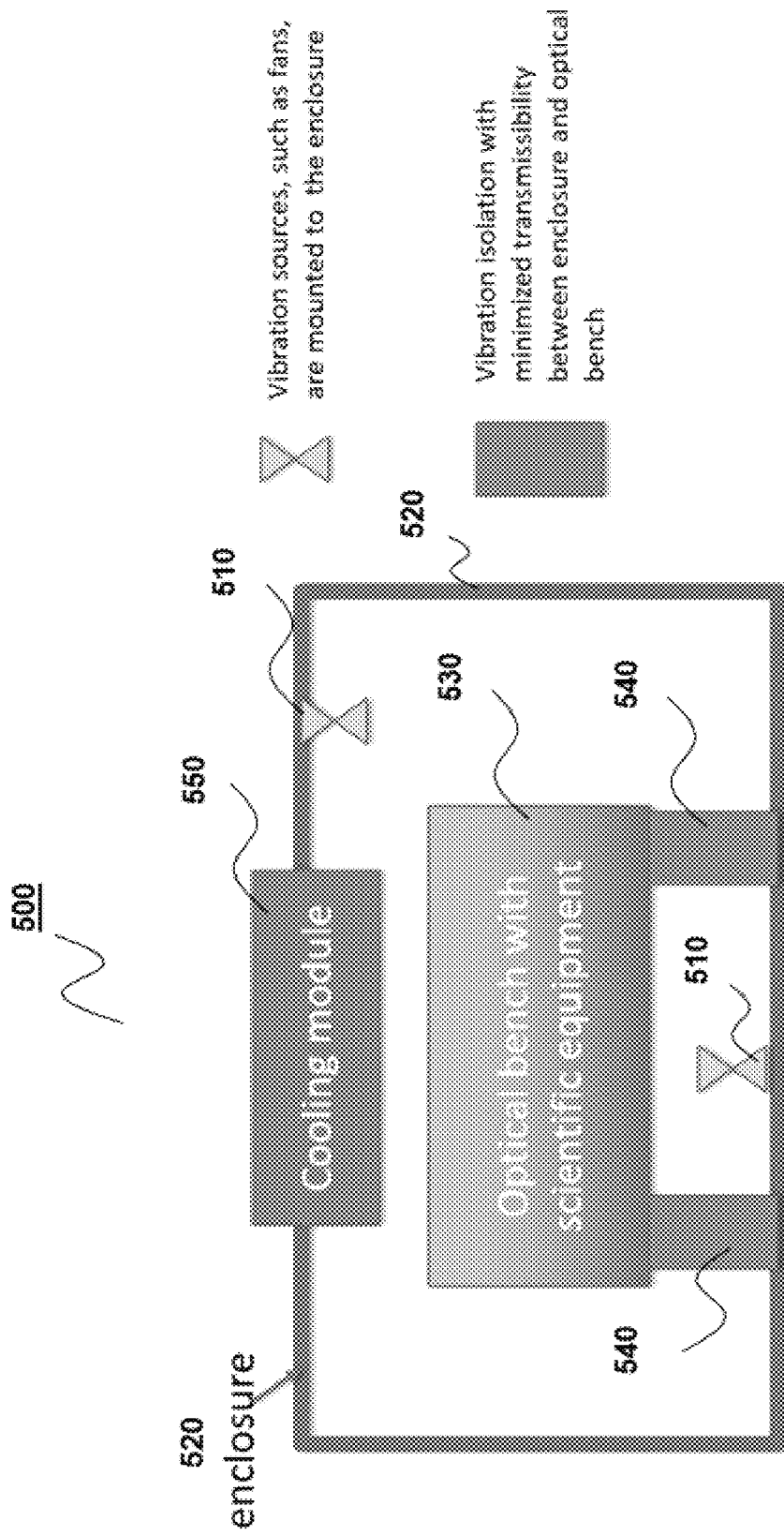
FIG. 7 provides a schematic diagram illustrating an example approach for vibrational isolation and cooling for liquid particle counter system.

FIG. 7 provides a schematic diagram illustrating an example approach for vibrational isolation and cooling for the liquid particle counter system (500). As illustrated in FIG. 7, components of the system corresponding to primary vibration sources (510), such as fans, pumps, fluid actuators, etc., are mounted directly or indirectly to the enclosure (520) of system (500). The optical bench (530), including scientific equipment such as one or more of optical sources, beam shaping optics, filters, attenuators, apertures, the flow cell, windows, collection optics for scattered light, optical detectors, beam steering and control elements, etc., is at least partially isolated from the enclosure (520) via one or more vibrational isolators (540) to provide vibration isolation with reduced or minimized transmissibility between the enclosure (520) and optical bench (530). Also shown in FIG. 7 is a cooling module (550) operationally connected to enclosure (520), to actively and/or passive control temperature of the system (500), including controlling temperature of optical bench (530) and components thereof, for example, to minimize changes in temperature during use.

Figure 8:
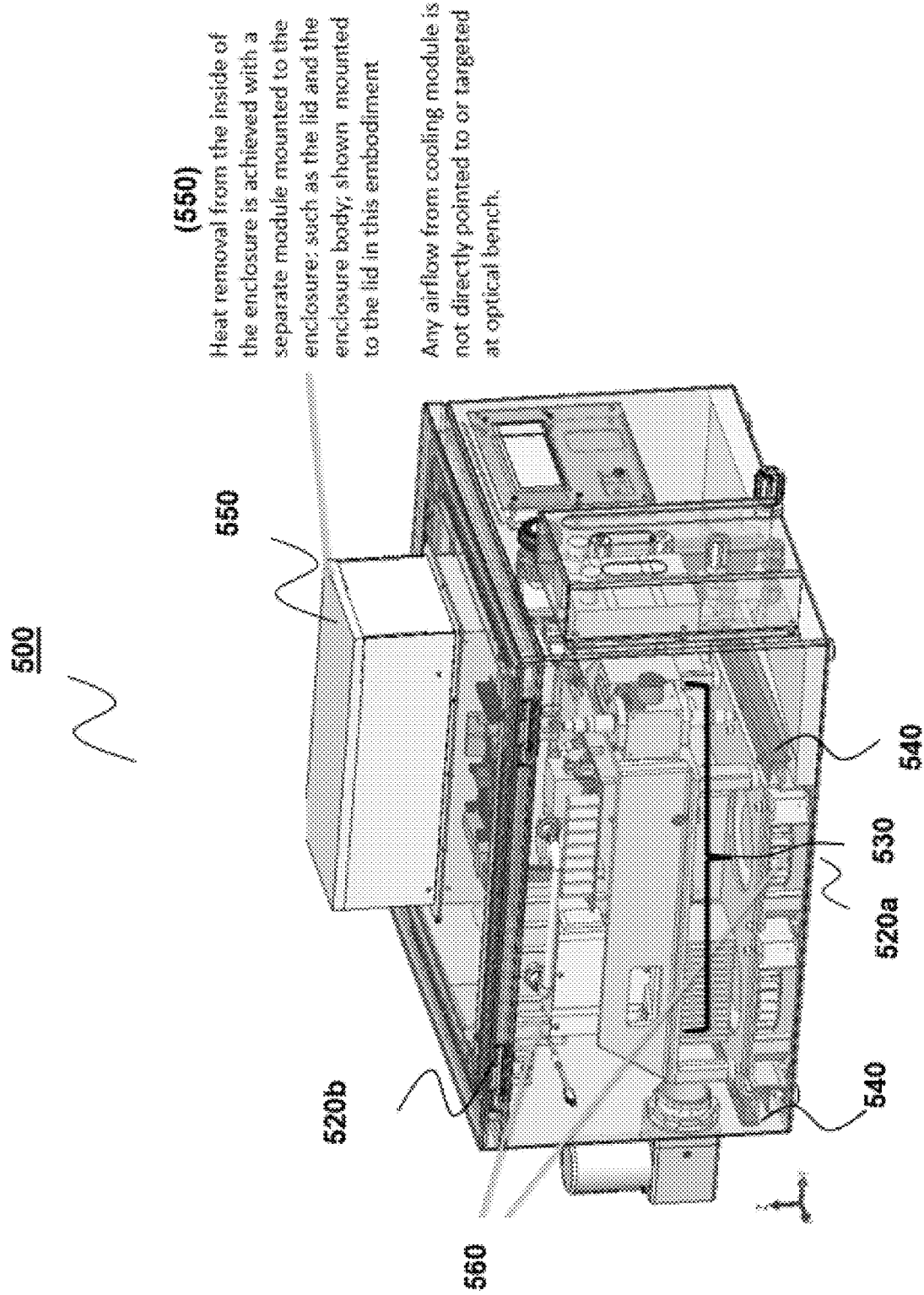
FIG. 8 provides a perspective view schematic of liquid particle counter system of showing elements for providing vibrational isolation and temperature control.

FIG. 8 provides a schematic of a perspective view of the liquid particle counter system (500) showing elements for providing vibrational isolation and temperature control. Internal cooling fans (560) are isolated from the optical bench and mounted to the enclosure (520), such as enclosure body (520a) and/or the enclosure lid (520b), and, thus, structurally separated from the optical bench (530). Heat removal from inside of the enclosure is achieved with a separate cooling module (550) mounted to the enclosure (520), such as the lid (520b) and/or the enclosure body (520a), shown mounted to the lid in this embodiment. In an embodiment, for example, airflow from cooling module (550) is not directly directed at, pointed to and/or targeted at optical bench. As show in FIG. 8, vibrational isolators (540) are provided to reduce and/or minimize transmission of vibrations from the enclosure (520) to elements of the optical bench (530).

In an embodiment, cooling module (550) includes an active Peltier thermoelectric cooler operationally coupled to the enclosure (520), for example, via an insulating gasket. Outside of the enclosure, in some embodiments, waste heat from the system is dissipated by contact with a heat transfer media, for example, using a fan, roots blower, compressed air, house vacuum, and/or liquid transfer media. Inside of the enclosure, in some embodiments, internal fans assist with the distribution of heat transfer media inside of the enclosure for thermal transfer.

Figure 9A:
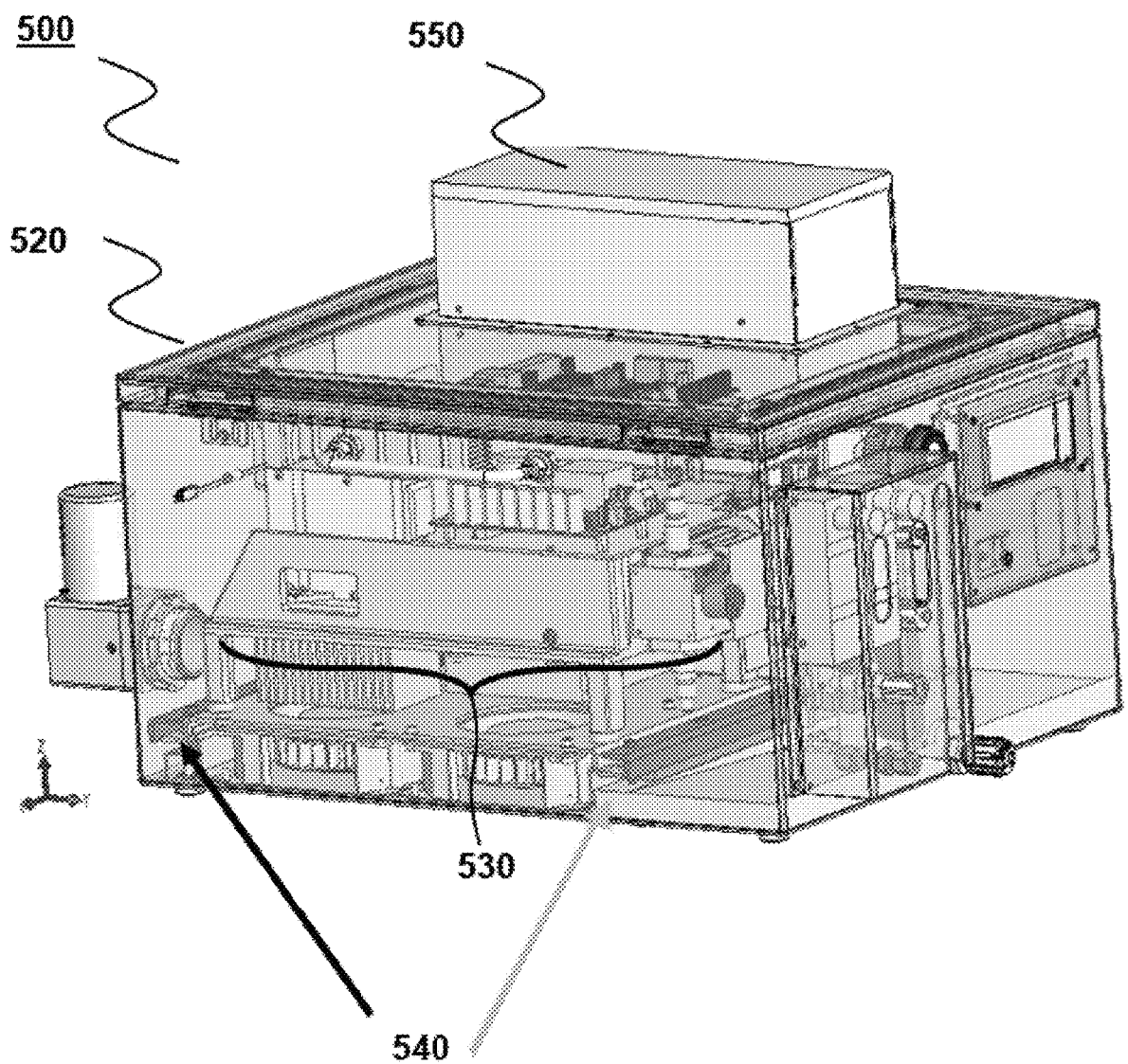
FIG. 9A provides a perspective view schematic of liquid particle counter system complementary to that of FIG. 8

FIG. 9A provides a perspective view schematic of the liquid particle counter system (500) complementary to that of FIG. 8 illustrating a configuration wherein the optical bench (530) is vibrational isolated from enclosure (520) via vibrational isolators (540) which reduce and/or minimize transmission of vibrations from the enclosure (520) to elements of the optical bench (530).

Figure 9B:
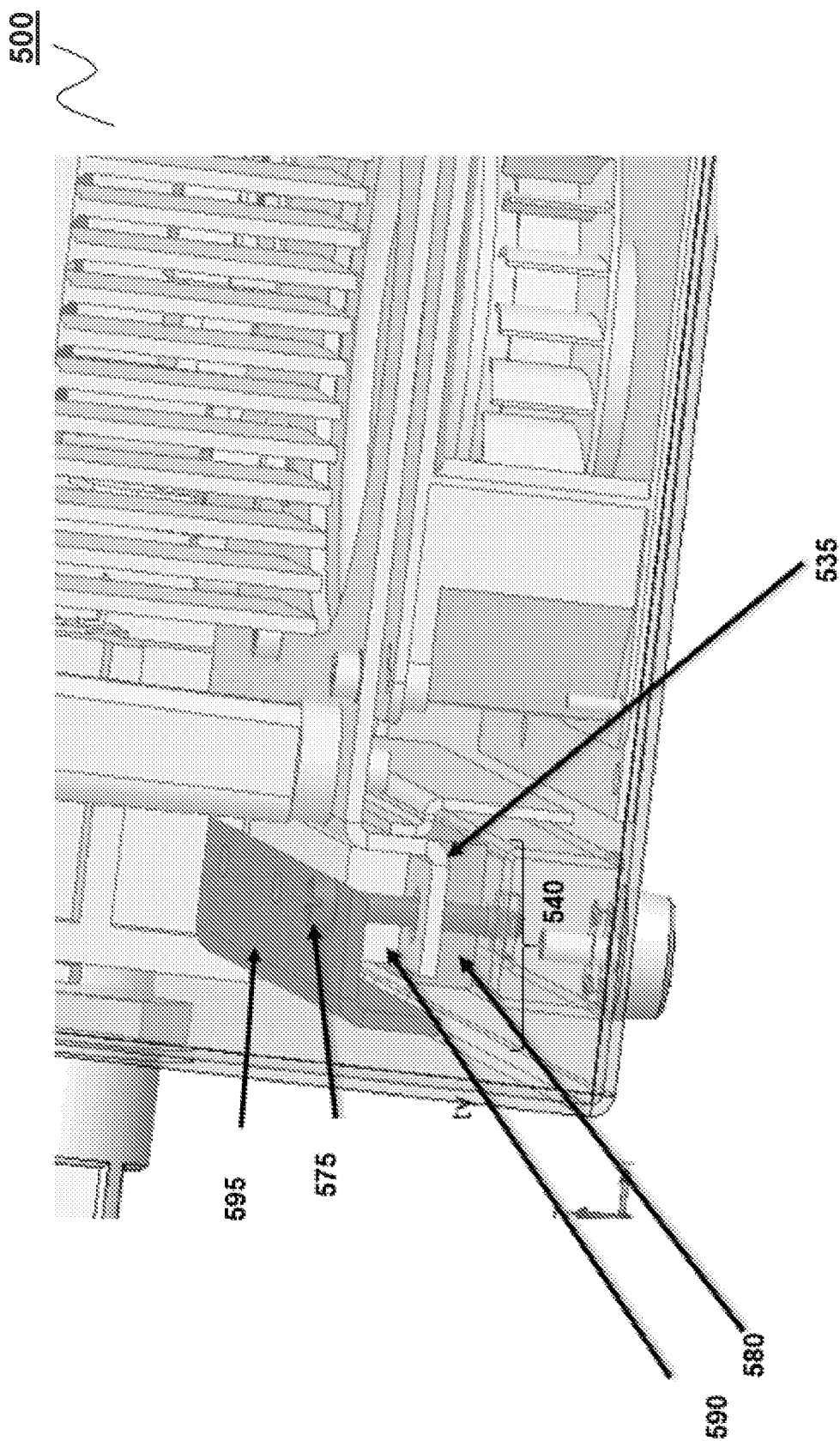
FIG. 9B provides an expanded view schematic of liquid particle counter system illustrating components of a vibrational isolator and how the vibrational isolator is coupled to the optical bench.

FIG. 9B provides an expanded view schematic of the liquid particle counter system (500) illustrating components of a vibrational isolator (540) and how the vibrational isolator (540) is coupled to the optical bench (530). As shown in FIG. 9B, adjustable hardware (575), such as a bracket and screw/bolt assembly, is provided to tune the vibration isolation by compressing the non-linear vibration material isolation layers to minimize the transmissibility of vibrations of the enclosure (520) to the optical bench (530).

In an embodiment, one or more vibration isolation material or layer is provided having different properties to isolate optical bench support (535) from enclosure (520) from vibration sources.

As illustrated in FIG. 9B, the base (580) comprising a soft material layer, such as an elastomer layer, is provided, wherein the optical bench (530) is placed directly or indirectly on base (580) of the dampening system, for example, via optical bench support (535). In some embodiments an additional dampening element (590) comprising a soft material layer, such as an elastomer layer, is provided between optical bench support (535) and coupling component (595). For example, the coupling component (595) may be configured to mechanically couple the base (580) and additional dampening element (590), such as provided by two opposing elastomer layers, together on either side of the optical bench support (535). This arrangement allows the structural optical bench support (535) to freely vibrate against at least two vibration layers comprising the base (580) and additional dampening element (590). In some embodiments, the vibration isolation properties of two isolation layers, such as base (580) and additional dampening element (590), is adjusted by deforming the vibration isolation layers for example using adjustable hardware (575) and coupling component (595). This is achieved, by coupling component (595), for example comprising a clamp, and the relative tightness of the adjustment screws/bolts adjustable hardware (575) which the changes the dynamic compressive modulus. Important parameters in the selection of materials for isolation layers, such as base (580) and additional dampening element (590), include the ratio of the excitation frequency to the natural frequency of the system, the dynamic shear ratio, and the transmissibility.

Embodiments—the invention is further set forth and exemplified by the following embodiments.

Embodiment 1: A particle detection system comprising:
a flow cell for flowing a fluid containing particles;
an optical source for generating one or more beams of electromagnetic radiation;
a beam shaping optical system for passing said one or more beams of electromagnetic radiation through said flow cell, thereby generating electromagnetic radiation scattered by said particles;
at least one optical detector array for receiving electromagnetic radiation from said flow cell, wherein said optical source, beam shaping optical system and optical detector array are configured to allow for interferometric detection of said particles and/or optical detection of particles having size dimensions less than or equal to 100 nm; and
wherein the system is configured such that at least one of a temperature, pressure, extent of vibrations, and extent of acoustic waves, or any combination of these are each independently maintained to be within a selected tolerance, so as to maintain a high signal-to-noise ratio during said detection of said particles.

Embodiment 2: The system of embodiment 1, wherein said optical source, beam shaping optical system and optical detector array are configured to provide structured beam interferometric detection of said particles by passing a structured probe beam of coherent electromagnetic radiation through said flow cell.

Embodiment 3: The system of embodiment 1, wherein said optical source, beam shaping optical system and optical detector array are configured to provide heterodyne interferometric detection of said particles by collecting off-axis scattered light and combining the off-axis scattered light scattered light with a reference beam to create the interferometric signal.

Embodiment 4: The system of embodiment 1, wherein said optical source and optical detector array are configured to provide single or multiple beam interferometric detection of said particles.

Embodiment 5: The system of embodiment 1, wherein said optical source and optical detector array are configured to provide structured dark beam interferometric detection of said particles.

Embodiment 6: The system of any of embodiments 1-5, wherein said optical detector array is positioned in optical communication with said flow cell for receiving incident electromagnetic radiation transmitted through said flow cell and electromagnetic radiation scattered by said particle.

Embodiment 7: The system of embodiment 6, wherein said electromagnetic radiation scattered by said particle comprises forward scattered electromagnetic radiation.

Embodiment 8: The system of any of embodiments 6-7, wherein said incident electromagnetic radiation transmitted through said flow cell and said electromagnetic radiation scattered by said particle undergo constructive and/or destructive optical interference.

Embodiment 9: The system of any of embodiments 1-8, wherein said optical detector array is provided at a scattering angle that is within 5 degrees of zero degrees relative to the optical axis of the incident beam.

Embodiment 10: The system of any of embodiments 1-9, wherein said optical detector array is provided at a scattering angle that is within 0.5 degrees of zero degrees relative to the optical axis of the incident beam.

Embodiment 11: The system of any of embodiments 1-10, wherein said optical detector array is provided in optical communication with said flow cell for detecting the interaction of the particle and the electromagnetic radiation scattered by said particle with the illuminating wave front.

Embodiment 12: The system of any of embodiments 1-11, wherein said system provides interferometric detection of said particles and/or optical detection of particles having size dimensions less than or equal to 100 nm without significant performance degradation of the internal particle counting process when subjected to one or more of the following conditions:
a. a change in T up to 5° C. at a rate of less than 1° C./hr;
b. a change in P up to 300 mbar;
c. a change in beam path length up to 10 mm;
d. a change in beam focus position up to 2 mm;
e. a change in beam power of up to 20%;
f. vibration level I up to 200 microns/sec;
g. a change in beam angle up to +/−5 degrees;
h. a condition of laser noise up to <2% (RMS);
i. a change in $M^2$ of laser up to <1.3;
j. a change in linewidth of laser up to <100 MHz;
k. a change in RH up to <50%;
l. controlling electric (line power) stability and noise; and
m. any combinations of these Embodiment 13: The system of any of embodiments 1-12, wherein the system further comprise a controller operationally coupled to said flow cell, optical source, beam shaping optical system, optical detector array or any combination of these, said controller for compensating for changes in said system parameters in response to ambient conditions, internal stimuli, external stimuli or any combination of these.

Embodiment 14: The system of embodiment 13, wherein said ambient conditions, internal stimuli or external stimuli are selected from the group consisting of change in temperature, change in pressure, vibration, acoustic waves, or any combination of these.

Embodiment 15: The system of any of embodiments 13-14, wherein said controller is a beam alignment system for monitoring position of said one or more beams of electromagnetic radiation and actively controlling the positioning and/or alignment of the flow cell, optical source, beam shaping optical system, optical detector array or any combination of these so as to maintain a high signal-to-noise ratio during said detection of said particles.

Embodiment 16: The system of embodiment 15, wherein said beam alignment system provides for compensation for thermal expansion optical drift.

Embodiment 17: The system of any of embodiments 15-16, wherein said beam alignment system provides for low frequency vibration compensation.

Embodiment 18: The system of any of embodiments 15-17, wherein said beam alignment system provides real-time control of the positioning and/or alignment of the flow cell, optical source, beam shaping optical system, optical detector array or any combination of these to within 5 microradians or less at a frequency of 250 Hz or greater.

Embodiment 19: The system of any of embodiments 15-18, wherein said beam alignment system is a closed loop system Embodiment 20: The system of any of embodiments 15-19, wherein said beam alignment system comprises a one or more photosensors and an actuator system.

Embodiment 21: The system of embodiment 20, wherein the one or more photosensors are quadrature photosensors positioned of said system and the actuator system comprises one or more piezo-electric-driven nanopositioners.

Embodiment 22: The system of any of embodiments 20-21, wherein the photosensors provide inputs to a closed loop system and the actuator system provide outputs to said closed loop system.

Embodiment 23: The system of any of embodiments 13-22, wherein said controller is an isolator or multiple isolators for isolating said flow cell, optical source, beam shaping optical system, optical detector array from changes in ambient conditions, internal stimuli, external stimuli of an operation environment or any combination of these.

Embodiment 24: The system of embodiment 23, wherein said isolator is a dampening component capable of at least partially preventing transmission of vibrations from an external operation environment to said system.

Embodiment 25: The system of any of embodiments 23-24, wherein said isolator is a dampening component capable of at least partially preventing transmission of vibrations originating from within the system itself.

Embodiment 26: The system of any of embodiments 24-25, wherein said dampening component is designed to reduce transmission of vibrations having a fundamental frequency of 60 Hz and above to less than 1%.

Embodiment 27: The system of any of embodiments 24-26, wherein said dampening component comprises a dampened spring mechanism, at least two mass dampers or any combination of these.

Embodiment 28: The system of embodiment 13, wherein said controller is an active cooling component capable of controlling the temperature of the flow cell, optical source, beam shaping optical system, optical detector array or any combination of these.

Embodiment 29: The system of embodiment 28, wherein said active cooling component is in thermal communication with the flow cell, optical source, beam shaping optical system, optical bench, optical detector array or any combination of these via conductive heat links.

Embodiment 30: The system of any of embodiments 28-29, wherein said active cooling component comprises a thermoelectric cooler.

Embodiment 31: The system of embodiment 30, wherein said thermoelectric cooler is provided not in thermal communication with an outer enclosure of said system.

Embodiment 32: The system of any of embodiments 30-31, wherein said thermoelectric cooler is provided in thermal communication with a heat exchange structure to remove heat from the thermoelectric cooler and inject heat into an environment external to said system.

Embodiment 33: The system of embodiment 32, wherein said heat exchange structure is a finned heat exchanger.

Embodiment 34: The system of any of embodiments 30-33, wherein said thermoelectric cooler is purged with a dry gas to prevent humidity condensation of cooled side.

Embodiment 35: The system of any of embodiments 30-34, wherein said thermoelectric cooler is purged with a dry gas to flow across hot side heat exchanger to enhance heat dissipation.

Embodiment 36: The system of any of embodiments 1-35, wherein the flow cell, optical source, beam shaping optical system, optical detector array or any combination of these are configured to provide passive isolation for compensating for changes in said system parameters in response to ambient conditions, internal stimuli or external stimuli.

Embodiment 37: The system of embodiment 36, wherein said passive isolation is provided by one or more of the following features:
  a. incorporation of one or more vibration isolators;
  b. incorporation of one or more adhesive layers in lenses;
  c. incorporation of one or more thermoset or thermoplastic mechanical restraints;
  d. reduced size and/or mass of optical source and components;
  e. incorporation of lens mounts having natural frequency greater than or equal to 150 Hz
  f. incorporation of flow cell mechanically isolated from optical source and components;
  g. coefficient of thermal expansion matched materials; and
  h. low coefficient of thermal expansion optical components.

Embodiment 38: The system of any of embodiments 1-37, wherein said optical source provides a coherent incident beam.

Embodiment 39: The system of any of embodiments 1-38, wherein said optical source provides a Gaussian incident beam.

Embodiment 40: The system of any of embodiments 1-39, wherein said optical source comprise one or more shaping and/or combining optical elements for generating said one or more beams of electromagnetic radiation.

Embodiment 41: The system of embodiment 40, wherein said one or more shaping and/or combining optical elements are diffractive elements, polarizing elements, intensity modulating elements, phase modulating elements or any combination of these.

Embodiment 42: The system of any of embodiments 1-41, wherein said one or more beams of electromagnetic radiation comprises a structured, non-Gaussian beam.

Embodiment 43: The system of embodiment 42, wherein said one or more beams of electromagnetic radiation comprises a dark beam.

Embodiment 44: The system of any of embodiments 42-43, wherein said one or more beams of electromagnetic radiation comprises a beam characterized by one or more line singularities Embodiment 45: The system of any of embodiments 42-43, wherein said one or more beams of electromagnetic radiation comprises an anamorphic beam.

Embodiment 46: The system of any of embodiments 42-45, wherein said one or more beams of electromagnetic radiation comprises an anamorphic beam in a top hat configuration.

Embodiment 47: The system of any of embodiments 1-46, wherein the optical detector array comprises a plurality of segmented linear or 2D arrays of detectors.

Embodiment 48: The system of any of embodiments 1-47, wherein the at least one optical detector array allows for differential detection.

Embodiment 49: The system of any of embodiments 1-48, wherein said fluid is a liquid or a gas.

Embodiment 50: The system of any of embodiments 1-49, wherein the system is for detection of particles in liquid chemicals.

Embodiment 51: The system of any of embodiments 1-50, wherein the system is for detection of particles in ultrapure water.

Embodiment 52: The system of any of embodiments 1-49, wherein the system is for detection of particles in high pressure gases.

Embodiment 53: The system of any of embodiments 1-49, wherein the system is for detection of particles on surfaces.

Embodiment 54: A method for detecting particles in a fluid, said method comprising:
provided a flow of said fluid containing particles;
generating one or more beams of electromagnetic radiation using an optical source; passing said one or more beams of electromagnetic radiation through said flow cell using a beam shaping optical system, thereby generating electromagnetic radiation scattered by said particles; and
directing electromagnetic radiation from said flow cell onto an optical detector array, thereby providing for interferometric detection of said particles and/or optical detection of particles having size dimensions less than or equal to 100 nm; wherein the flow cell, optical source, beam shaping optical system, optical detector array or any combination of these are configured and/or controlled so as to maintain a high signal-to-noise ratio during said detection of said particles.

Embodiment 53: The method of embodiment 54, wherein said optical detector array is positioned in optical communication with said flow cell for receiving incident electromagnetic radiation transmitted through said flow cell and electromagnetic radiation scattered by said particle.

Embodiment 54: The method of embodiment 55, wherein said electromagnetic radiation scattered by said particle comprises forward scattered electromagnetic radiation.

Embodiment 55: The method of any of embodiments 55-56, wherein said incident electromagnetic radiation transmitted through said flow cell and said electromagnetic radiation scattered by said particle undergo constructive and/or destructive optical interference.

Embodiment 56: The method of any of embodiments 54-57, wherein said optical detector array is provided at a scattering angle that is within 5 degrees of zero degrees relative to the optical axis of the incident beam.

Embodiment 57: The method of any of embodiments 54-58, wherein said optical detector array is provided at a scattering angle that is within 0.5 degrees of zero degrees relative to the optical axis of the incident beam.

Embodiment 58: The method of any of embodiments 54-59, wherein said optical detector array is provided in optical communication with said flow cell for detecting the interaction of the particle and the electromagnetic radiation scattered by said particle with the illuminating wave front.

Embodiment 59: The method of any of embodiments 54-60, wherein said method provides interferometric detection of said particles and/or optical detection of particles having size dimensions less than or equal to 100 nm without significant performance degradation of the internal particle counting process when subjected to one or more of the following conditions:
 a. a change in T up to 5° C. at a rate of less than 1° C./hr;
 b. a change in P up to 300 mbar;
 c. a change in beam path length up to 10 mm;
 d. a change in beam focus position up to 2 mm;
 e. a change in beam power of up to 20%;
 f. vibration level I up to 200 microns/sec;
 g. a change in beam angle up to +/−5 degrees;
 h. a condition of laser noise up to <2% (RMS);
 i. a change in $M^2$ of laser up to <1.3;
 j. a change in linewidth of laser up to <100 MHz;
 k. a change in RH up to <50%;
 l. controlling electric (line power) stability and noise; and
 m. any combinations of these.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The following patents and patent applications relate to interferometric particle detection using a structured beam and are incorporated by reference in their entireties: U.S. Pat. No. 7,746,469; US 20170176312; WO 2019/082186; and 62/838,835.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, are disclosed separately. When a Markush group or other grouping is used herein, all individual members of the group and all combinations and sub-combinations possible of the group are intended to be individually included in the disclosure.

Every device, system, formulation, combination of components, or method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:
1. A particle detection system comprising:
   optical components, the optical components including:
      a flow cell for flowing a fluid containing particles;
      an optical source for generating one or more beams of electromagnetic radiation;
      a beam shaping optical system for passing said one or more beams of electromagnetic radiation through said flow cell, thereby generating electromagnetic radiation scattered by said particles; and
      at least one optical detector array for receiving the scattered electromagnetic radiation from said flow cell, wherein said optical source, beam shaping optical system and optical detector array are configured to allow for detection of particles having size dimensions less than or equal to 100 nm;
   an optical bench, wherein the flow cell, the optical source, the beam shaping optical system, and the at least one optical detector array are supported by the optical bench
      a particle detector housing enclosing the optical bench and the optical components thereon such that the optical bench and the optical components thereon are thermally isolated from an external environment;
      an active temperature control system comprising:
         a first closed loop temperature control system configured to control the temperature of the optical source, the first closed loop temperature control system comprising:
            a first thermoelectric cooler and a first temperature sensor, the first thermoelectric cooler and the first temperature sensor being thermally coupled to an inner space of the optical source;
            a first temperature controller in electrical communication with the first thermoelectric cooler and the first temperature sensor, wherein the first temperature controller is configured to control the temperature of the inner space of the optical source; and
         a second closed loop temperature control system configured to control the temperature of an interior volume of the particle detector housing, the interior volume being defined by one or more interior surfaces of the housing, wherein the optical bench and the optical components thereon, including the optical source, are disposed in the interior volume of the housing, the second closed loop temperature control system comprising:
            a second thermoelectric cooler configured to cool a heat transfer medium circulating within the housing and a second temperature sensor being thermally coupled to the interior volume of the housing;

a fluid circulation device disposed within the housing and configured to circulate the heat transfer medium throughout; and
a vibration isolation device configured to reduce vibrations transmitted from the fluid circulation device to the optical bench;
wherein the active temperature control system is configured to control a temperature of the interior volume of the enclosure including the optical bench and the components thereon; and
wherein the system is further configured to control at least one of: pressure, extent of vibrations, and extent of acoustic waves, or any combination of these to be within a selected tolerance, so as to maintain a high signal-to-noise ratio during said detection of said particles.

2. The system of claim 1, wherein said optical source, beam shaping optical system and optical detector array are configured to provide at least one of structured beam interferometric detection of said particles by passing a structured probe beam of coherent electromagnetic radiation through said flow cell, or heterodyne interferometric detection of said particles by collecting off-axis scattered light and combining the off-axis scattered light scattered light with a reference beam to create the interferometric signal.

3. The system of claim 1, wherein said optical source and optical detector array are configured to provide structured dark beam interferometric detection of said particles.

4. The system of claim 1, wherein said optical detector array is positioned in optical communication with said flow cell for receiving incident electromagnetic radiation transmitted through said flow cell and electromagnetic radiation scattered by said particle, and wherein said electromagnetic radiation scattered by said particle comprises forward scattered electromagnetic radiation.

5. The system of claim 1, wherein said optical detector array is positioned in optical communication with said flow cell for receiving incident electromagnetic radiation transmitted through said flow cell and electromagnetic radiation scattered by said particle, and wherein said incident electromagnetic radiation transmitted through said flow cell and said electromagnetic radiation scattered by said particle undergo constructive and/or destructive optical interference.

6. The system of claim 1, wherein said optical detector array is provided at a scattering angle that is within 5 degrees of zero degrees relative to the optical axis of the incident beam.

7. The system of claim 1, wherein said system provides interferometric detection of said particles and/or optical detection of particles having size dimensions less than or equal to 100 nm without significant performance degradation of the internal particle counting process when subjected to one or more of the following conditions:
  i. a change in T up to 5° C. at a rate of less than 1° C./hr;
  ii. a change in P up to 300 mbar;
  iii. a change in beam path length up to 10 mm;
  iv. a change in beam focus position up to 2 mm;
  v. a change in beam power of up to 20%;
  vi. vibration level I up to 200 microns/sec;
  vii. a change in beam angle up to +/−5 degrees;
  viii. a condition of laser noise up to <2% (RMS);
  ix. a change in $M^2$ of laser up to <1.3;
  x. a change in linewidth of laser up to <100 MHz;
  xi. a change in RH up to <50%;
  xii. controlling electric (line power) stability and noise; and
  xiii. any combinations of these.

8. The system of claim 1, wherein said active temperature controller is provided for compensating for changes in said system parameters in response to ambient conditions, internal stimuli, external stimuli or any combination of these so as to prevent performance degradation due to optical alignment shifts to maintain a high signal-to-noise ratio during said detection of said particles.

9. The system of claim 8, wherein the flow cell, optical source, beam shaping optical system, optical detector array or any combination of these are configured to provide passive isolation for compensating for changes in said system parameters in response to ambient conditions, internal stimuli or external stimuli, wherein said passive isolation is provided by one or more of the following features:
  xiv. incorporation of one or more vibration isolators;
  xv. incorporation of one or more adhesive layers in lenses;
  xvi. incorporation of one or more thermoset or thermoplastic mechanical restraints;
  xvii. reduced size and/or mass of optical source and components;
  xviii. incorporation of lens mounts having natural frequency greater than or equal to 150 Hz
  xix. incorporation of flow cell mechanically isolated from optical source and components;
  xx. coefficient of thermal expansion matched materials; and
  xxi. low coefficient of thermal expansion optical components.

10. The system of claim 8, wherein said optical source provides a coherent incident beam or a Gaussian incident beam.

11. The system of claim 8, wherein said optical source comprises one or more shaping and/or combining optical elements for generating said one or more beams of electromagnetic radiation, wherein said one or more shaping and/or combining optical elements are diffractive elements, polarizing elements, intensity modulating elements, phase modulating elements or any combination of these.

12. The system of claim 8, wherein said one or more beams of electromagnetic radiation comprises at least one of (1) a structured, non-Gaussian beam, (2) a dark beam, (3) a beam characterized by one or more line singularities, or (4) an anamorphic beam.

13. The system of claim 12, wherein said one or more beams of electromagnetic radiation comprises an anamorphic beam in a top hat configuration.

14. The system of claim 8, wherein the optical detector array comprises a plurality of segmented linear or 2D arrays of detectors.

15. The system of claim 8, wherein the at least one optical detector array allows for differential detection.

16. The system of claim 8, wherein the system is for at least one of detection of particles in liquid chemicals, in ultrapure water, in high pressure gases, or on surfaces.

17. The system of claim 1, comprising a beam alignment system for monitoring position of said one or more beams of electromagnetic radiation and actively controlling the positioning and/or alignment of the flow cell, optical source, beam shaping optical system, optical detector array or any combination of these so as to maintain a high signal-to-noise ratio during said detection of said particles, and
  wherein said beam alignment system provides for at least one of or any combination of the following:
    (1) compensation for thermal expansion optical drift;
    (2) low frequency vibration compensation; or
    (3) real-time control of the positioning and/or alignment of the flow cell, optical source, beam shaping optical system, optical detector array or any combination of these to within 5 microradians or less at a frequency of 250 Hz or greater.

18. The system of claim 17, wherein said beam alignment system is a closed loop control system.

19. The system of claim 17, wherein said beam alignment system comprises a one or more photosensors and an actuator system.

20. The system of claim 19, wherein the one or more photosensors are quadrature photosensors and the actuator system comprises one or more piezo-electric-driven nanopositioners.

21. The system of claim 19, wherein the photosensors provide inputs to said closed loop control system and the actuator system provides outputs to said closed loop control system.

22. The system of claim 1, comprising an isolator or multiple isolators for isolating said flow cell, optical source, beam shaping optical system, optical detector array from changes in ambient conditions, internal stimuli, external stimuli of an operation environment or any combination of these, and wherein said isolator is a dampening component capable of at least one of (1) at least partially preventing transmission of vibrations from an external operation environment to said system, or (2) at least partially preventing transmission of vibrations originating from within the system itself.

23. The system of claim 22, wherein said dampening component is designed to reduce transmission of vibrations having a fundamental frequency of 60 Hz and above to less than 1%.

24. The system of claim 22, wherein said dampening component comprises a dampened spring mechanism, at least two mass dampers or any combination of these.

25. The system of claim 1, wherein said second thermoelectric cooler is provided in thermal communication with a heat exchange structure to remove heat from the second thermoelectric cooler and inject heat into an environment external to the particle detector housing.

26. The system of claim 1, wherein the active temperature control system is configured to maintain a constant temperature of the optical components to within 3° C.

27. A method for detecting particles in a fluid, said method comprising:
providing a flow of said fluid containing particles;
generating one or more beams of electromagnetic radiation using an optical source;
passing said one or more beams of electromagnetic radiation through said flow cell using a beam shaping optical system, thereby generating electromagnetic radiation scattered by said particles; and
directing electromagnetic radiation from said flow cell onto an optical detector array, thereby providing for interferometric detection of said particles and/or optical detection of particles having size dimensions less than or equal to 100 nm;
wherein the flow cell, optical source, beam shaping optical system, and optical detector array are supported on an optical bench;
wherein said optical bench is enclosed in a particle detector housing such that the optical bench and the optical components thereon are thermally isolated from an external environment; and
wherein the flow cell, optical source, beam shaping optical system, optical detector array or any combination of these are configured and/or controlled so as to maintain a high signal-to-noise ratio during said detection of said particles;
the method further comprising controlling a temperature of: the interior of the enclosure, the optical bench, and the components thereon via an active temperature control system, the active temperature control system comprising:
a first closed loop temperature control system configured to control the temperature of the optical source, the first closed loop temperature control system comprising:
a first thermoelectric cooler and a first temperature sensor, the first thermoelectric cooler and the first temperature sensor being thermally coupled to an inner space of the optical source;
a first temperature controller in electrical communication with the first thermoelectric cooler and the first temperature sensor, wherein the first temperature controller is configured to control the temperature of the inner space of the optical source; and
a second closed loop temperature control system configured to control the temperature of an interior volume of the particle detector housing, the interior volume being defined by one or more interior surfaces of the housing, wherein the optical bench and the optical components thereon, including the optical source, are disposed in the interior volume of the housing, the second closed loop temperature control system comprising:
a second thermoelectric cooler configured to cool a heat transfer medium circulating within the housing and a second temperature sensor being thermally coupled to the interior volume of the housing;
a fluid circulation device disposed within the housing and configured to circulate the heat transfer medium throughout; and
a vibration isolation device configured to reduce vibrations transmitted from the fluid circulation device to the optical bench.

* * * * *